(12) United States Patent
Nathanson et al.

(10) Patent No.: US 9,503,968 B2
(45) Date of Patent: Nov. 22, 2016

(54) VEHICLE COMMUNICATIONS VIA WIRELESS ACCESS VEHICULAR ENVIRONMENT

(71) Applicants: Martin D. Nathanson, Toronto (CA); Neal Fairbanks, Southfield, MI (US)

(72) Inventors: Martin D. Nathanson, Toronto (CA); Neal Fairbanks, Southfield, MI (US)

(73) Assignee: Paxgrid Telemetric Systems, Inc., Southfield, MI (US)

( * ) Notice: Subject to any disclaimer, the term of this patent is extended or adjusted under 35 U.S.C. 154(b) by 0 days.

(21) Appl. No.: 14/798,959

(22) Filed: Jul. 14, 2015

(65) Prior Publication Data

US 2015/0319681 A1    Nov. 5, 2015

Related U.S. Application Data

(63) Continuation of application No. 14/151,035, filed on Jan. 9, 2014, now abandoned.

(60) Provisional application No. 61/750,630, filed on Jan. 9, 2013, provisional application No. 61/883,594, filed on Sep. 27, 2013.

(51) Int. Cl.
    *G06F 19/00*    (2011.01)
    *H04W 48/16*    (2009.01)
    (Continued)

(52) U.S. Cl.
    CPC ............. *H04W 48/16* (2013.01); *G07C 5/008* (2013.01); *G07C 5/0808* (2013.01); *H04W 4/046* (2013.01); *H04W 84/12* (2013.01)

(58) Field of Classification Search
    CPC ..... G06Q 40/08; H04W 4/046; G06F 9/542; G06K 9/00812; G07C 5/008

USPC .................... 701/31.4; 342/357.28; 340/438; 709/224; 246/473.1; 370/338; 348/148
See application file for complete search history.

(56) References Cited

U.S. PATENT DOCUMENTS 6,263,268 B1    7/2001    Nathanson
7,593,999 B2    9/2009    Nathanson
(Continued)

FOREIGN PATENT DOCUMENTS

CA    2791268 A1    4/2002
WO    2011/033365 A2    3/2011

OTHER PUBLICATIONS

Mahmoud Efatmaneshnik et al., "A Cooperative Positioning Algorithm for DSRC Enabled Vehicular Networks", Archives of Photogrammetry, Cartography and Remote Sensing, vol. 22, 2011, pp. 117-129.

(Continued)

*Primary Examiner* — McDieunel Marc
(74) *Attorney, Agent, or Firm* — Katten Muchin Rosenman LLP

(57) ABSTRACT

Vehicle Communications using IEEE 802.11p WAVE functionality includes structure and method whereby a smart phone (SP) linked to an On Board Unit (OBU) having WAVE functionality, and incorporating Automotive Telemetry Protocol (ATP), has at least one processor to configure the SP as a GUI for the OBU, and to enable WAVE authentication of the SP through a networked Road Side Unit. Preferably, the OBU opens, after a command from an ATP Client, a virtual connection for streaming data between the vehicle data bus and a remote server providing an automotive scan tool. Also preferably, the SP may use either cellular or IEEE 802.11 control signals to trialaterate its geographic position with greater accuracy than GPS, and to hand off the geo-position fixes to the OBU. Accumulated geo-location information may be reported to a remote server, providing a centralized geographic trend analysis of plural SPs operating with OBUs.

8 Claims, 19 Drawing Sheets

(51) Int. Cl.
*H04W 4/04* (2009.01)
*G07C 5/00* (2006.01)
*G07C 5/08* (2006.01)
*H04W 84/12* (2009.01)

(56) References Cited

U.S. PATENT DOCUMENTS

| | | | |
|---|---|---|---|
| 8,514,825 B1* | 8/2013 | Addepalli | H04W 4/046 |
| | | | 370/338 |
| 8,560,609 B2 | 10/2013 | Nathanson | |
| 8,797,938 B2 | 8/2014 | Kim et al. | |
| 2007/0156311 A1 | 7/2007 | Elcock et al. | |
| 2011/0231546 A1 | 9/2011 | Jung et al. | |
| 2013/0301584 A1 | 11/2013 | Addepalli et al. | |
| 2013/0342368 A1 | 12/2013 | Nathanson | |
| 2014/0195102 A1* | 7/2014 | Nathanson | G07C 5/0808 |
| | | | 701/31.4 |

OTHER PUBLICATIONS

Michael Todd, Jay Farrell and Matthew Barth, "Connected Vehicle Technology Challenge: Lane-Level Vehicle Positioning using DSRC as an Aiding Signal", Proposing Organization: Transportation Systems Research Group, College of Engineering—Center for Environmental Research and Technology (CE-CERT), University of California, Riverside (UCR), May 2, 2011.

Zhao lei Feng, "A simulation study of unified GPS and roadside ranging technologies for vehicle positioning", Master's thesis, Sep. 16, 2011, Queensland University of Technology.

Huang-fu C. et al., "Location Tracking for WAVE Unicast Service", 71st Vehicular Technology Conference, May 16-19, 2010, (VTC 2010—Spring), IEEE.

Strang, T., "Intelligent Transportation Systems—Wireless Access for Vehicular Environments (WAVE)", 2010, retrieved on Aug. 13, 2014 from <http://www.sti-innsbruck.at/sites/default/files/courses/fileadmin/documents/its-ss10/07-its-WAVE. pdf>, pp. 1-25.

Transmittal; International Search Report; and Written Opinion of the International Searching Authority for International Application No. PCT/182014;000811 with a mailing date of Aug. 29, 2014.

Chia-Ho Ou: "A roadside unit-based localization scheme for vehicular ad hoc networks", International Journal of Communication Systems, vol. 27, No. 1, Apr. 12, 2012, pp. 135-150.

Partial European Search Report for European Patent Application No. 14746431.7 with a mailing date of Aug. 10, 2016.

* cited by examiner

Figure 2 WAVE Protocol Stack

PRIOR ART

Figure 3 OBU and Heads-Up Display Authentication

Figure 4 Propagation of WSMP notifications to the Heads-Up Display

Figure 5 ATP Communications with a WAVE-Enabled OBU

Figure 6 Remote Scan Tool

Figure 7 Smart Phone Geo-positioning using Cellular or WiFi Signals

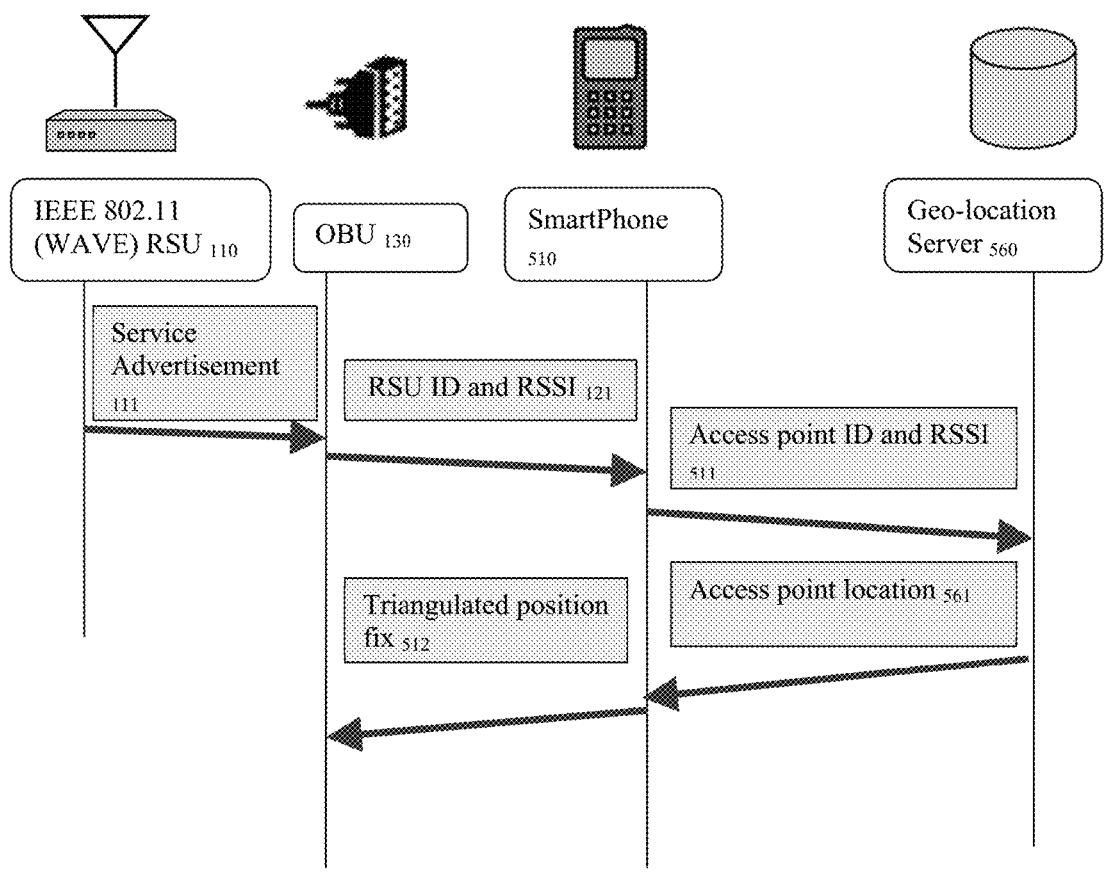
Figure 8 Harnessing IEEE 802.11(p) Signals for Smart Phone Geo-positioning

Figure 9 Geo-location Server Logic
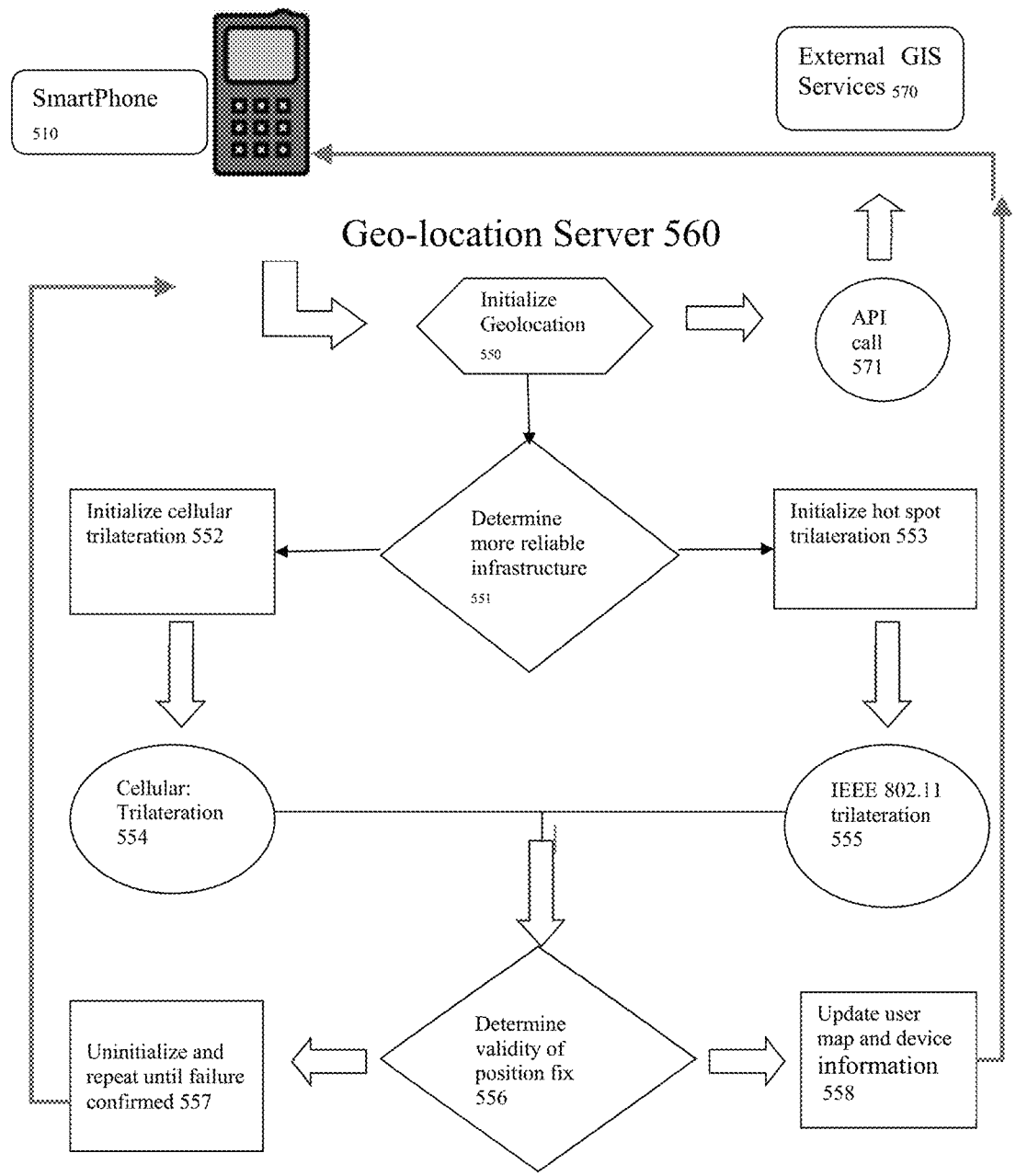

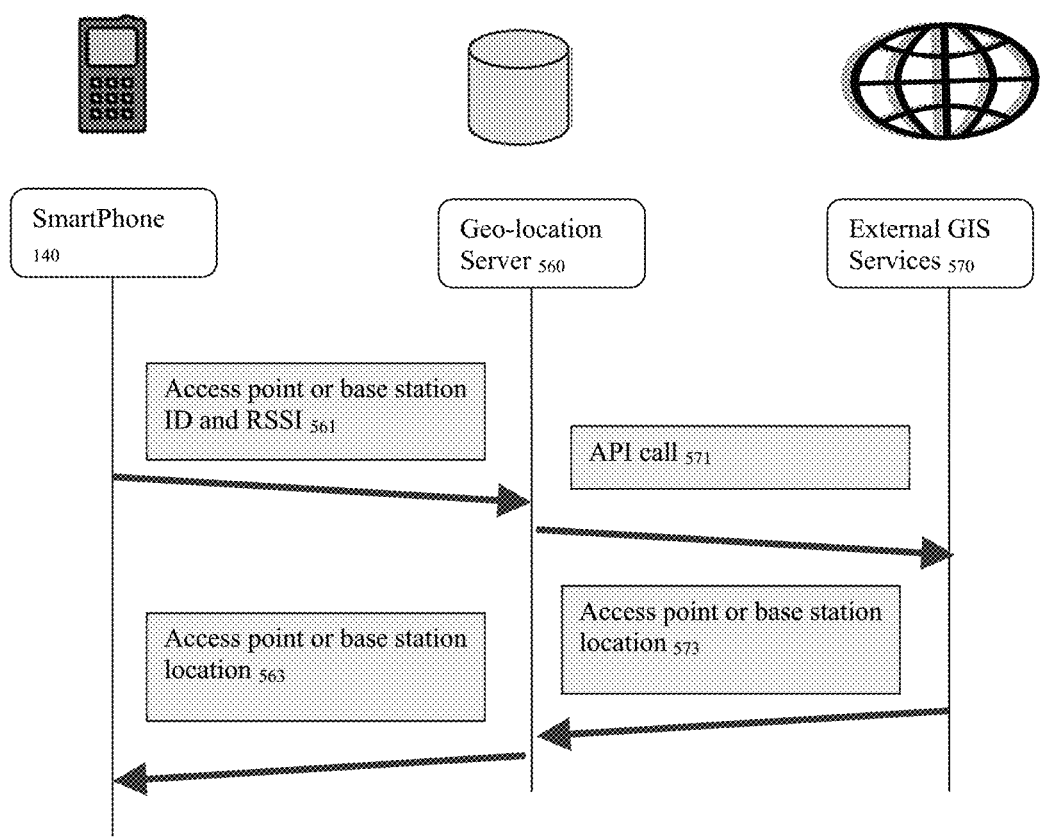
Figure 10 Geo-location of New Access Point or Base Station

Figure 11 Embedded Geo-location Logic
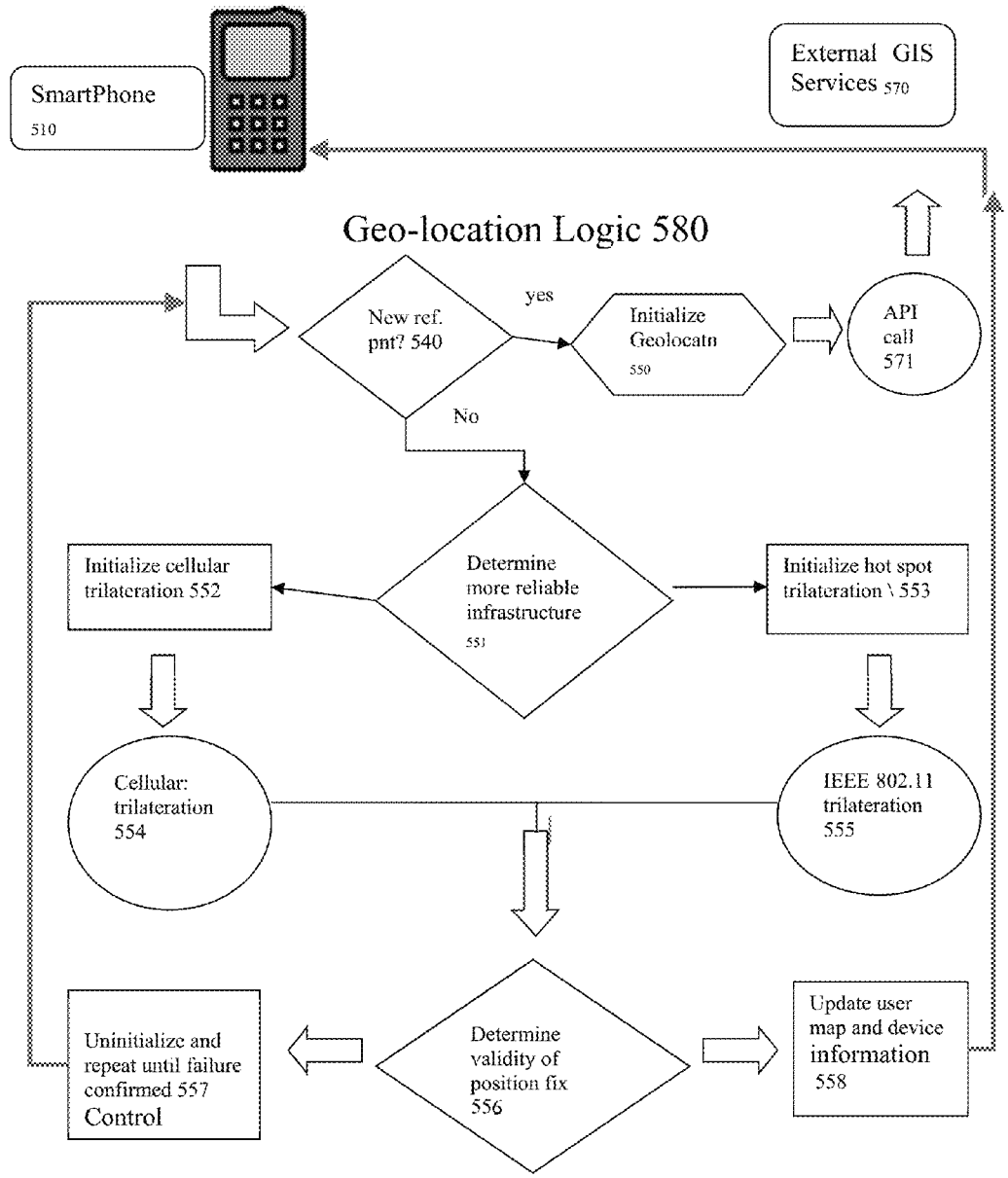

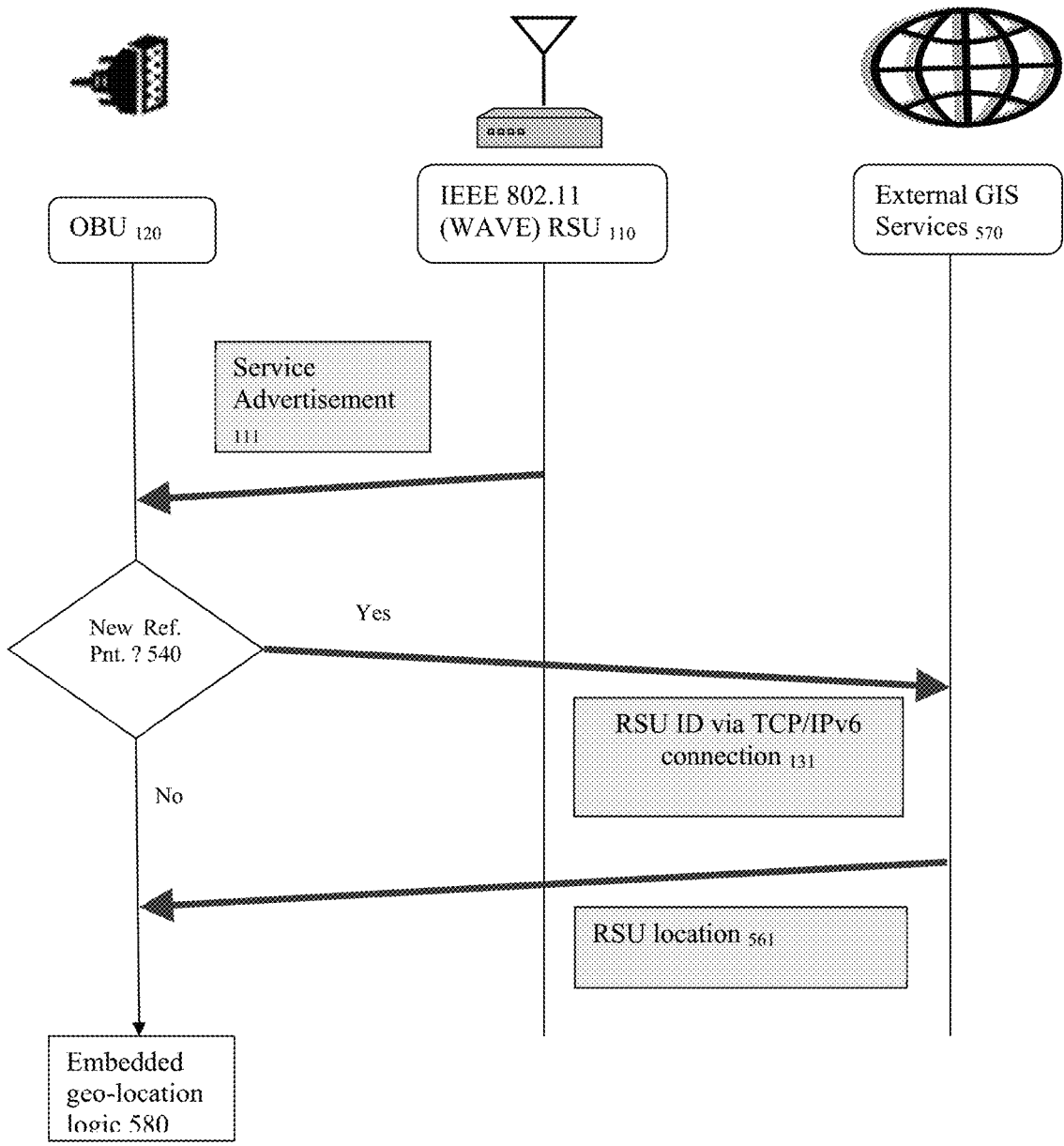
Figure 12 Geo-location Embedded in OBU

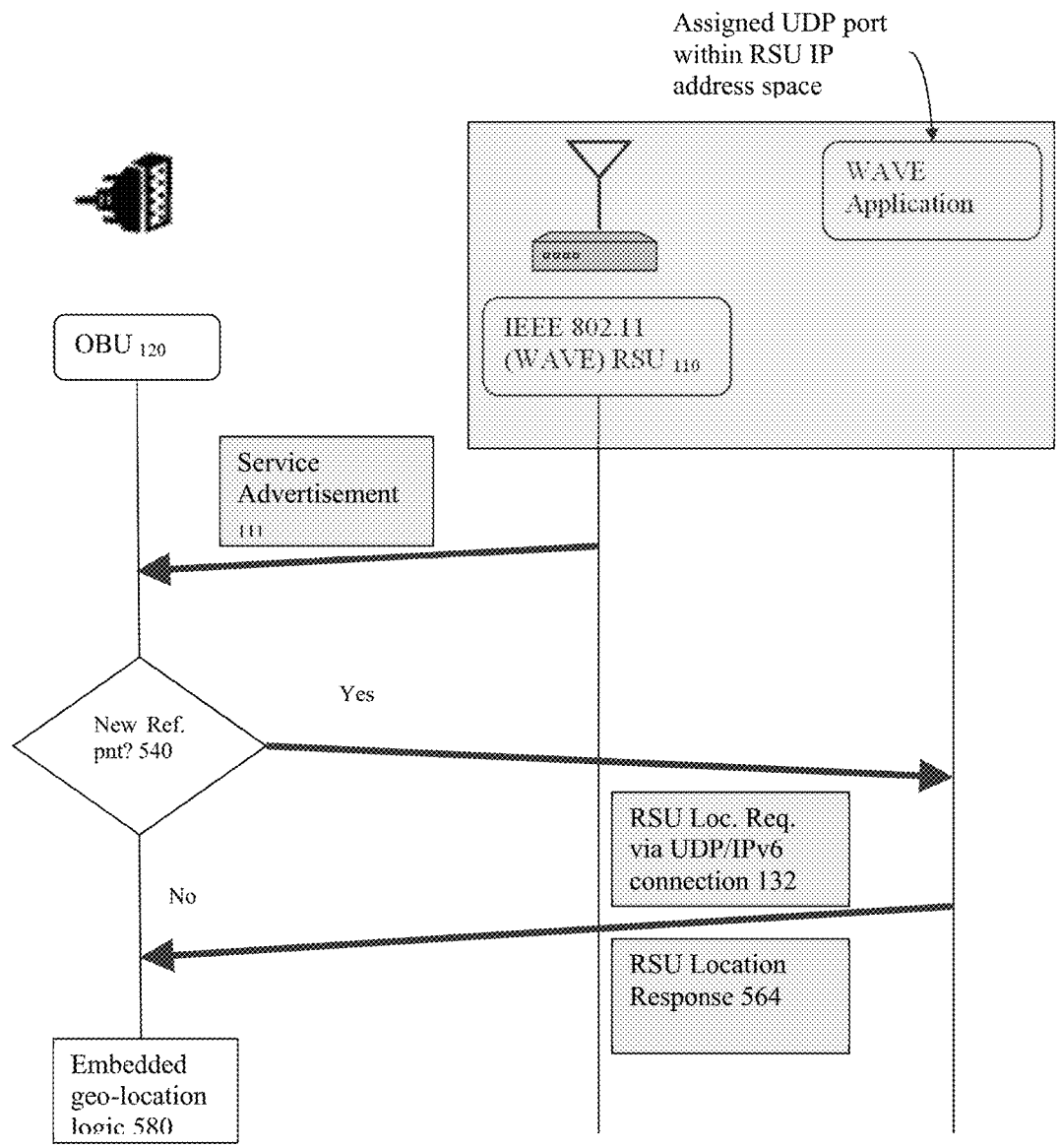
Figure 13 RSU Location Acquisition via WAVE Service Application Co-Sited with RSU

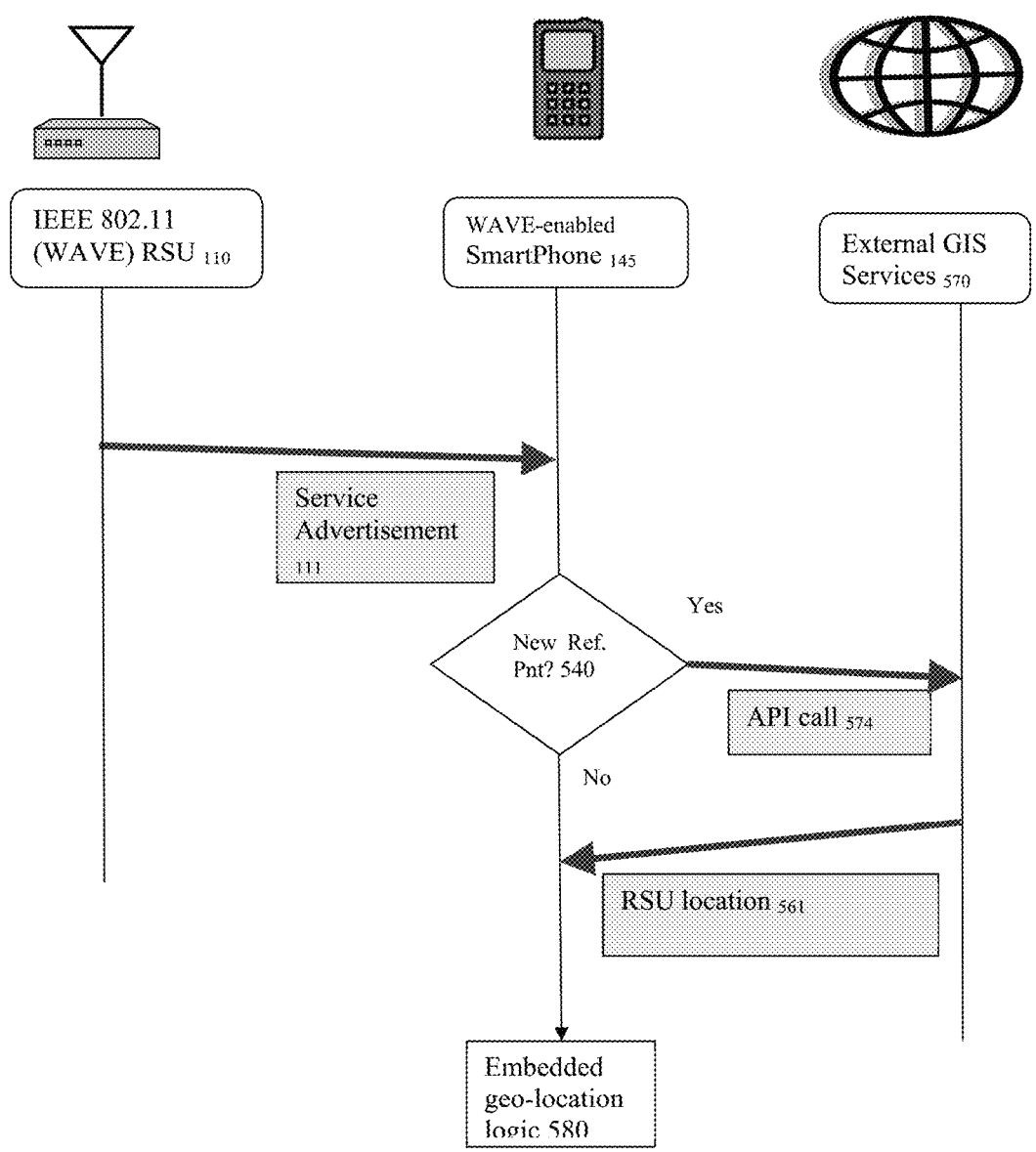
Figure 14a Geo-positioning with WAVE-Enabled Smart Phone

Figure 14b Geo-positioning with 2 WAVE RSUs
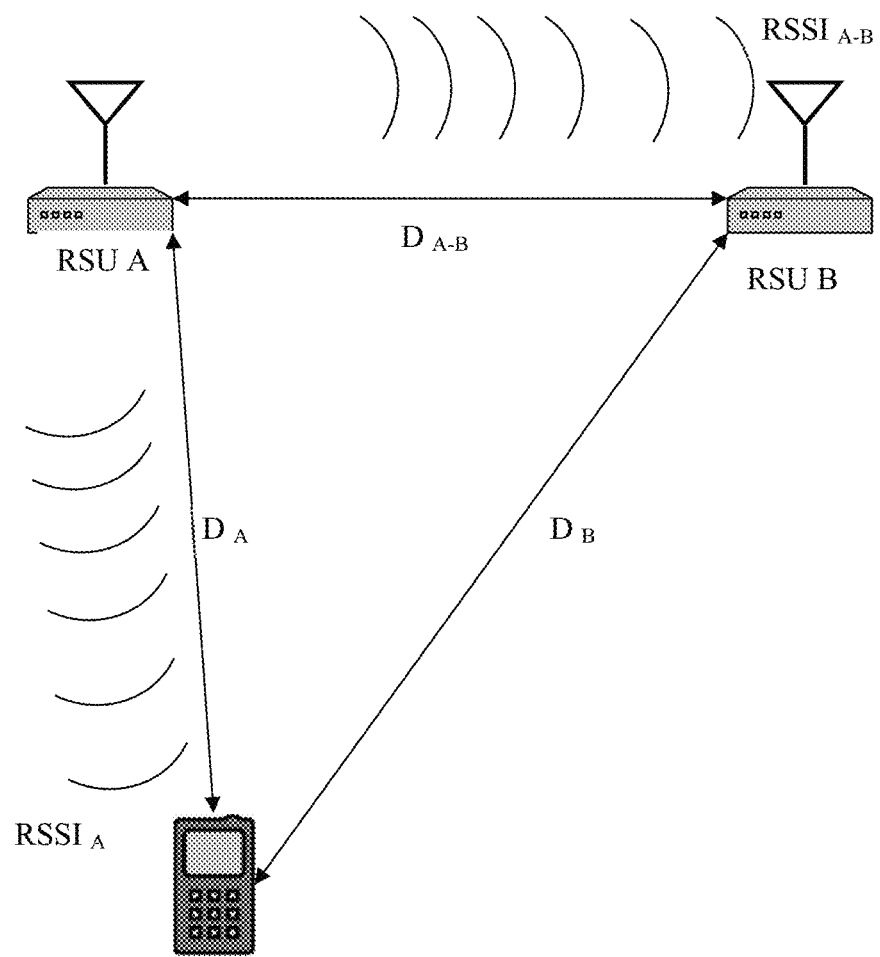

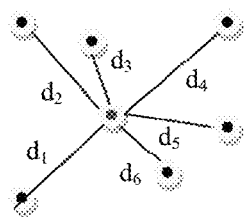
Figure 14c Geo-position Scatter and Total Graph Length

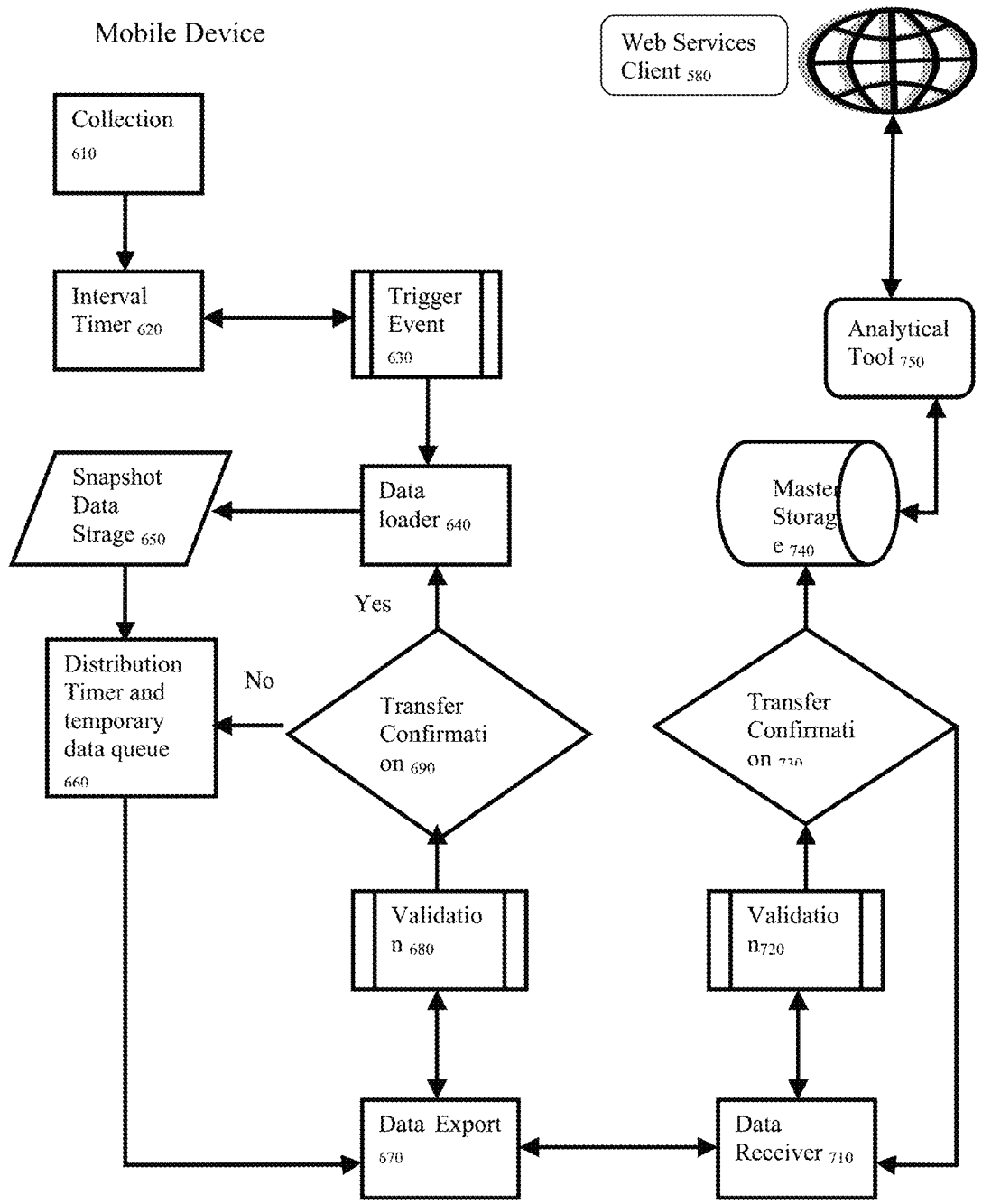
Figure 15 Collection and Processing of Location Trend Data

Figure 16  Distribution of Geographic Awareness Updates to Contributing Smart Phone Devices.
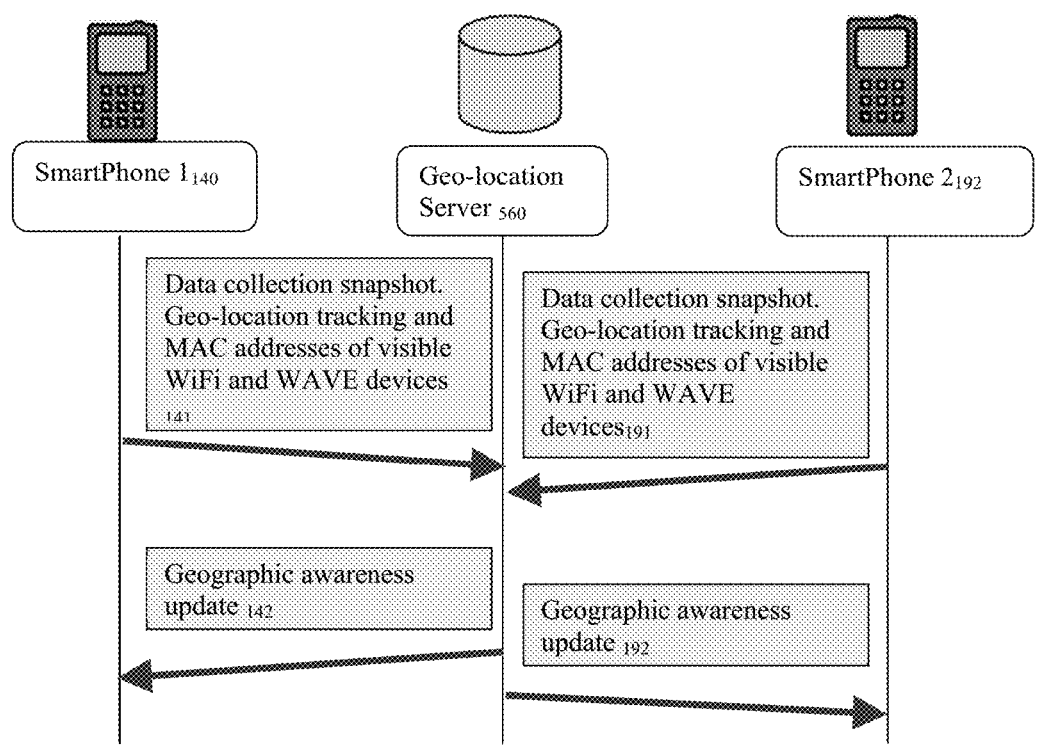

Figure 17 (a) Vehicle forward axis of movement compared with smart phone rotation
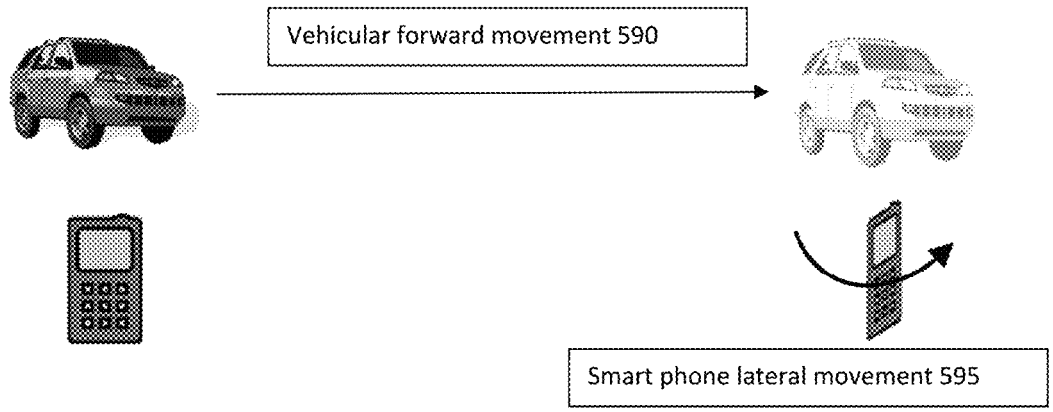
Figure 17 (b) Logic Flow for each Geo-location Cycle
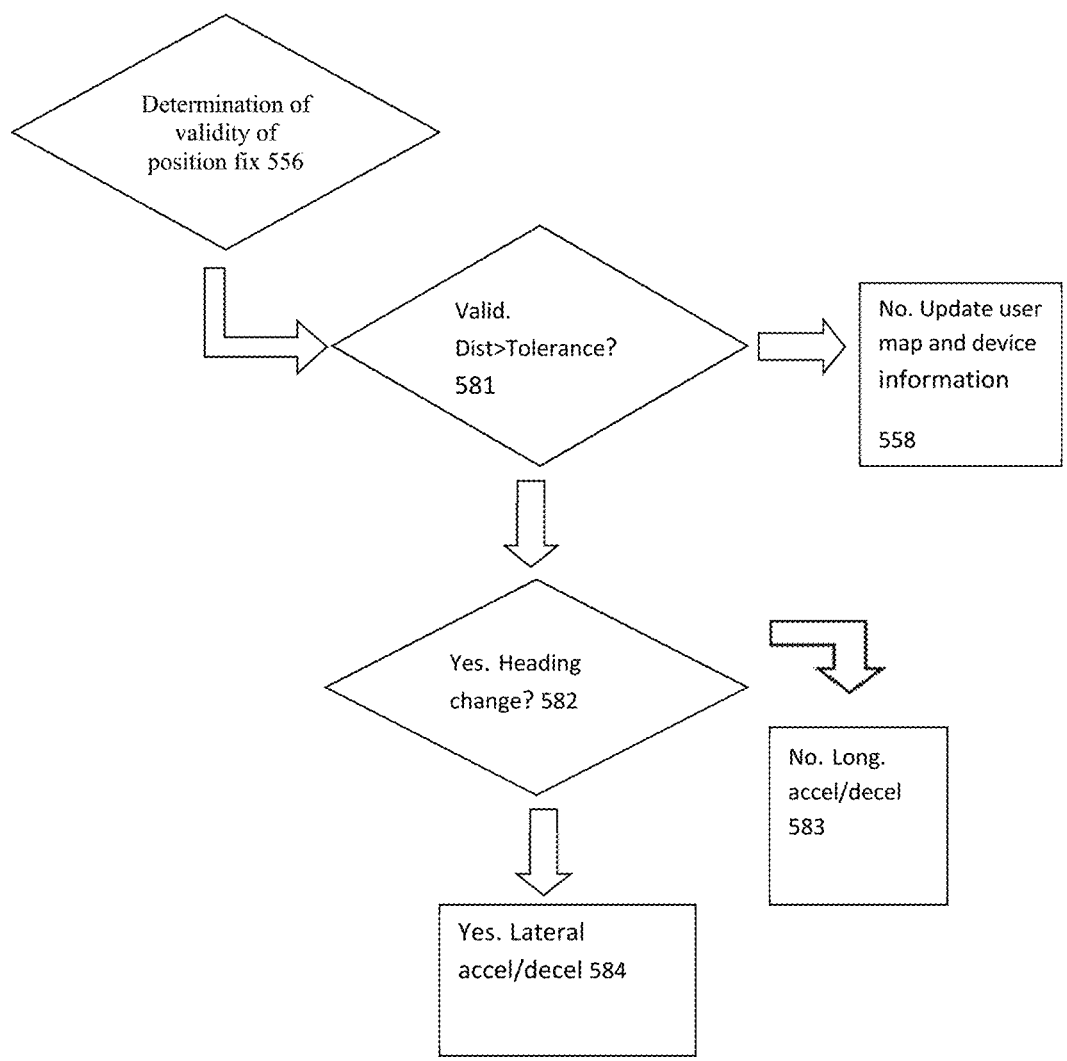

VEHICLE COMMUNICATIONS VIA WIRELESS ACCESS VEHICULAR ENVIRONMENT

This application is a continuation of U.S. patent application Ser. No. 14/151,035, filed Jan. 9, 2014, which claims the benefit of U.S. Provisional patent applications: 61/750,630, filed Jan. 9, 2013; and 61/883,594, filed Sep. 27, 2013, the contents of all incorporated herein by reference.

BACKGROUND OF THE INVENTION

The automobile industry has spent the last ten years evolving standards around which intelligent vehicle-vehicle (V2V) communications technology can be integrated into new products and deployed in conjunction with roadside infrastructure that will transform the way vehicles operate and co-operate, on the roadways.

Following the recommendation of the Intelligent Transportation Society of America (ITSA) in 2002, the IEEE created a task group in 2004 with the mandate of amending the IEEE 802.11 wireless LAN specification in order to accommodate the mobility, speed and range of vehicular network nodes. The group produced an amended specification entitled IEEE 802.11p in 2007 (incorporated herein by reference).

In 802.11p, network nodes are referred to as stations. They are either mobile, which are called On-Board Units (OBU) or Roadside Service Units (RSU). The architecture of IEEE 802.11p is intended to ensure that both OBU's and RSU's have the flexibility to support a wide scope of applications related to road safety, traffic management and roadside infrastructure. This is accomplished within a framework called WAVE (Wireless Access Vehicular Environment). The WAVE architecture, shown in FIG. 2, encompasses the 802.11p amendment as well as the new specifications (all incorporated herein by reference):

IEEE 1609.1 Resource Manager
IEEE 1609.2 Security Services
IEEE 1609.3 Network and Transport Services (Layers 3 and 4 of OSI)
IEEE 1609.4 Multichannel operation
FIG. 2 (from FIG. 2 of Roberto A. Uzcátegui, Guillermo Acosta-Marum, "WAVE: A Tutorial," IEEE Communications Magazine, May 2009, pp. 126-133) is a representation of the complete WAVE protocol stack running in either an OBU or an RSU. Although not explicitly shown in FIG. 2, at the PHY (physical) layer, the medium is sub-divided into 7 channels: 1 control channel (CCH) and 6 "service" channels (SCH).

This framework does not specify any of the typical applications that ultimately represent the end-user objectives of the Intelligent Vehicle Highway System (IVHS), such as vehicle-vehicle safety alerts, electronic toll collection, parking control and traffic signalization. In conjunction with the Society of Automotive Engineers (SAE) a standardized set of safety alert messages has been defined for enabling such functions as collision avoidance, lane change notification and brake application notification, and IEEE 1609.3 requires such messages to be transmitted on the control channel (CCH) But the broad range of other applications which can be supported by the WAVE architecture and have yet to be specified or, in some cases, even defined, will be achieved by a process that comprises the following steps:

An RSU or an OBU station that provides a service should advertise it with a WAVE Service Advertisement (WSA). WSAs are transmitted on the control channel (CCH). This includes, among other parameters, the specification of the service channel (SCH) on which the service is offered.

An OBU station that wants to use a service should monitor the SCH on which is offered.

These simple mechanisms provide the basic ad-hoc networking building blocks allowing OBU stations to cooperate in achieving road-safety objectives. Note that this same mechanism applies in exactly the same fashion, without distinction, in the case of an RSU interacting with OBUs. This provides the foundation for electronic tolling, parking control, road signage and intelligent traffic signalization.

WAVE Short Message Protocol (WSMP). One of the basic elements of the WAVE protocol stack, defined in IEEE 1609.3, is a mechanism for delivery of Basic Safety Messages. The set of such messages is defined in SAE J2735 (incorporated herein by reference) and is intended to support the following safety alert and vehicle autonomous driving mechanisms:

Blind spot warning
Cooperative adaptive cruise control
Cooperative collision warning:
Cooperative forward collision warning
Emergency vehicle at scene warning
Lane change warning.
WSMP is specified to operate over the control channel (CCH).

User Interface. It is currently anticipated that WAVE-enabled vehicles will be available from automotive OEMs by Model Year 2016. Such products will incorporate some form of display, either integrated into the vehicle dashboard or into the windshield as a Heads-up display (HUD), that presents the Basic Safety Messages to the driver in a safe, effective manner. The term "HUD" will henceforth be used in this document to refer to either a screen integrated into the vehicle dashboard or overlaid on the windshield in a way that does not obstruct the driver's field of vision.

Neighbor Discovery: A New WAVE Service. In U.S. patent application Ser. No. 13/022,101 (incorporated herein by reference), it is envisioned that V2V communication based on the ad-hoc networking specifications of IEEE 802.11 can be rendered more effective if all vehicles maintain a real-time picture of the position, heading, and speed of all vehicles around them. By doing so, each vehicle can establish a set of neighboring vehicles from which notifications of driving maneuvers, such as sudden braking or lane changes, can be judged to represent potential threats. The neighborhood of any vehicle changes dynamically, and the IEEE 802.11 channel on which monitoring is carried out, changes according to dynamically changing conditions on the road, as would be the case on exiting one freeway to enter another.

In this system, all vehicles are required to broadcast their GPS location and heading, at frequencies that provide for this information at least several times a second. Within the WAVE framework, messages containing the requisite information would constitute a service offered by each OBU. The channel on which the messages are transmitted is identified in the WAVE Service Announcement (WSA), sent on the CCH, by an RSU controlling access to a particular segment of roadway, and neighboring OBUs should listen to that channel in order to make use of the service.

IEEE 1609 specifies that WAVE Short Message Protocol (WSMP) messages are high priority notifications and should be sent over the control channel (CCH). It would therefore be conceptually possible to implement a Neighbor Discovery (ND) (This should not to be confused with the concept of Neighbor Discovery specified in ICMPv6. "Neighborhood" in the latter context is topological and does not encompass a geographic (i.e. GPS) component.) mechanism which is restricted to use of the CCH. However, this would increase the contention for the single channel, leading to degradation in reliability of the service. The mechanism envisioned in U.S. patent application Ser. No. 13/022,101 is therefore the following:

An OBU entering an intelligent roadway (or highway) receives a service announcement (WSA) on the CCH issued by the RSU (Roadside Unit) located on the entrance ramp.

The service announcement would specify the service channel (SCH) on which Neighbor Discover (ND) announcements can be received.

The OBU would be required to fully "participate" in this service, i.e. issue ND announcements on the specified SCH. At the same time, it listens to this channel to discover its neighbors and posts the received information, including GPS and heading of neighboring vehicles, to the HUD.

The RSU monitors the specified SCH for ND announcements in order to register each new OBU entering the roadway.

This mechanism presupposes that entry to all intelligent highways is controlled by roadside infrastructure. In this scenario, service channels would be allocated to specific segments of roadway and remain unchanged. Channel allocation would be predetermined for each roadway so as to minimize the possibility of two roadways in geographic proximity using the same channel and hence reducing the potential for channel contention, particularly in high volume scenarios (traffic congestion). On entry, if the OBU is currently transmitting ND announcements on another SCH, it should continue to do so until it has received confirmation from the RSU that its current geo-position places it unambiguously on the roadway controlled by that RSU. The converse applies on exit. Once it has received the confirmation from the RSU, it may notify its (former) neighbors that it is leaving the neighborhood.

However, beyond the goal of minimizing channel contention, the concept of a vehicle "neighborhood" based on Neighbor Discovery operating on judiciously allocated service channels, is important to establish whether Basic Safety Messages (issued on the Control Channel) are coming from vehicles in the same neighborhood. For instance, two vehicles on two roadways at different elevations might, due to greater levels of error in GPS altitude than in horizontal position measurement, appear to be in the same neighborhood, whereas one is moving on the service road, and the other on an elevated or below grade highway. The geo-position of one vehicle may appear to put it directly in front of the other so that Basic Safety Message from it would be interpreted as requiring collision-avoidance behavior whereas they are not even on the same roadway. These kinds of ambiguities can only be resolved if each OBU can determine at any moment the neighborhood of vehicles in which it is operating and from which Basic Safety Messages are relevant.

System Redundancy. OBUs should monitor all service channels to ensure that changes in the neighborhood are detected in the event of malfunctioning RSU (roadside service units) or communications errors have resulted in dropped messages. An OBU can therefore discover when it has either entered or left a freeway by matching its own location and heading with Neighbor Discovery messages being received on a service channel which is different than the one on which it is currently operating. This provides an important degree of system redundancy and ensures that failure to communicate with an RSU on entry or exit will be self-correcting.

Automotive Telemetry. As envisioned in U.S. patent application Ser. No. 13/022,101, a minimal network of RSUs is important for WAVE-enabled vehicles to navigate through a road network that includes intelligent roadways. But since the WAVE protocol stack incorporates UDP (User Datagram Protocol) and TCP/IPv6 (Transmission Control Protocol/Internet protocol, version 6), as shown in FIG. 2, this creates the potential for generic Internet-based communications with any WAVE-enabled vehicle within range of an RSU.

For purposes such as monitoring driver behavior, remote automotive diagnostics, position tracking, and geofence violation (a geo-fence is a virtual perimeter for a real-world geographic area), a protocol inspired by SNMP (Simple Network Management Protocol. See Internet Engineering Task Force RFC 1157) is defined in U.S. Pat. No. 6,263,268, and U.S. Pat. No. 7,593,999 (both incorporated herein by reference). This technology, called Automotive Telemetry Protocol (ATP), envisions each device on-board a vehicle as a Server (or managed device), capable of asynchronous event reporting to a plurality of Clients, each of which are authenticated using public/private key encryption, and capable of responding to GET (requests for data) or SET (configuration) commands issued by a Client. The notion of a Diagnostic Information Base (DIB), corresponding to the role of a Management Information Base (MIB) in SNMP, ensures that all ATP communications between Server and Client should reference specific elements of the DIB and enables authorization for access to the DIB to be granted or denied to Clients, with respect to individual elements of the DIB.

Hence, ATP Clients, using UDP/IPv6, may interact with ATP Server functionality embedded in OBUs. However, if wireless communications with a vehicle is entirely dependent on the WAVE roadside infrastructure to reach vehicles, then two problems arise:

Mobile-originated asynchronous event reports (mobile-originated asynchronous event reports are transported by INFORM messages, which are defined in SNMP as Protocol Data Units (PDUs) which emanate from the managed device and require acknowledgement by the remote management system (Client)) cannot reach the client(s) authorized to receive them until the vehicle is within range of an RSU and has acquired an IPv6 network address. The importance of receiving event reports in "real-time" (in this context, the term "real-time" implies that the event communication is received more or less within a few seconds of the time it occurs) varies with the nature of the remote Client entity. For instance, it may not be critical for insurance companies monitoring driver behavior, whereas the acquisition of data in real-time may be essential to an automotive service technician who wants to initiate a remote diagnostic session with the OBD-II (On-board diagnostic) bus as soon as a diagnostic trouble code (DTC) is reported to it via ATP.

Mobile-terminated communications initiated by a client, such as a GET or SET command, cannot reach the managed device (OBU) unless is it currently shares an 802.11p data link with an RSU. In other words, again, it should be within range of WAVE roadside infrastructure.

The present invention envisions mechanisms to ensure that an OBU enabled for ATP can overcome these limitations.

SUMMARY OF THE INVENTION

After Market WAVE-enabled devices. The deployment of roadside infrastructure for WAVE and the pace at which existing roadways are designated as "intelligent" requires a critical mass of WAVE-enabled vehicles to warrant the conversion of roadways to WAVE. Since authorization to use intelligent roadways would normally be restricted to WAVE-enabled vehicles, then, if the technology is limited to new manufactured vehicles, it may take 10-15 years from the first model year of WAVE-enabled vehicles before the benefits can begin to be realized. After-market WAVE-enabled devices would enable a substantial portion existing vehicles in use to be retrofitted, thereby creating an option for existing vehicles that would facilitate any administrative decision to convert a roadway to WAVE.

The present invention is therefore intended to create a WAVE-enabled technology which may be deployed to both retrofit existing vehicles as well to allow OEMs to integrate WAVE in new vehicles with user interface functionality that can be harnessed from third-party devices. This technology may also incorporate the capabilities described in U.S. Pat. No. 6,263,268, and U.S. Pat. No. 7,593,999. However, it should enable existing vehicles to meet the same standards of performance that will be applied to newly manufactured vehicles, without engendering any complications that would compromise the objective of WAVE, which is enhanced road safety. This is accomplished through the creation of new mechanisms which can be integrated into an after-market device with little or no hardware cost beyond what is required to comply with IEEE 1609.

Authentication. In the present invention, an intelligent roadway is one in which authorization of use is restricted to vehicles that are WAVE-enabled. A roadway may be designated as intelligent by administrative decree, without necessarily creating any physical infrastructure which would deny access to unauthorized vehicles. No assumptions are made about the penalties or other administrative measures required to prevent or discourage unauthorized use of designated roadways. However, it is assumed that authorization to use a designated roadway may be granted to an OBU from a service running, either on an RSU associated with an entrance to the roadway, or on a remote server reachable via IPv6 routing through an RSU. Throughout the remainder of this document, we refer to this service as a Roadway Authorization Service (RAS).

Authentication of an OBU may have a variety of purposes depending on the applicable legislation with respect to, primarily, law enforcement and tolls. Again, no assumptions are made regarding the various needs that authentication may service. The only necessary condition for the present invention is that the OBU may be subject to an authentication challenge to prove that it has a valid identity. The mechanism of any such challenge and the required response are governed by the security provisions of IEEE 1609.2.

BRIEF DESCRIPTION OF THE DRAWINGS

The unique advantages of the present invention will be better understood by reference to the following Detailed Description of the Preferred Embodiments and the attached Drawings.

FIG. 8 is a schematic block and functional diagram of the harnessing of IEEE 802.11(p) signals for smart phone geo-positioning.

FIG. 9 is a schematic block and functional diagram of the geo-location server logic FIG. 10 is a schematic block and functional diagram of the geo-location for a new access point or base station, which has just become visible to the Smart Phone.

FIG. 11 is a schematic block and functional diagram for the geo-location logic embedded in the Smart Phone.

FIG. 12 is a schematic block and functional diagram of the geo-positioning implemented by a WAVE OBU with an Internet connection to a remote Geographic Information Systems service.

FIG. 13 is a schematic block and functional diagram for acquisition of the geo-location of an RSU via a WAVE service application co-sited with the RSU.

FIGS. 14a, 14b, and 14c comprise schematic block and functional diagrams for geo-positioning by a WAVE-enabled Smart Phone.

FIG. 15 is a flowchart of the collection and processing of location trend data.

FIG. 16 is a block and functional diagram of the distribution of geographic awareness updates to contributing smart phone devices.

FIGS. 17(a) and 17(b) comprise block and functional diagrams of Virtual Accelerometer in Brought-In Smart Phone.

DETAILED DESCRIPTION OF THE PRESENTLY PREFERRED EXEMPLARY EMBODIMENTS

Figure 1:
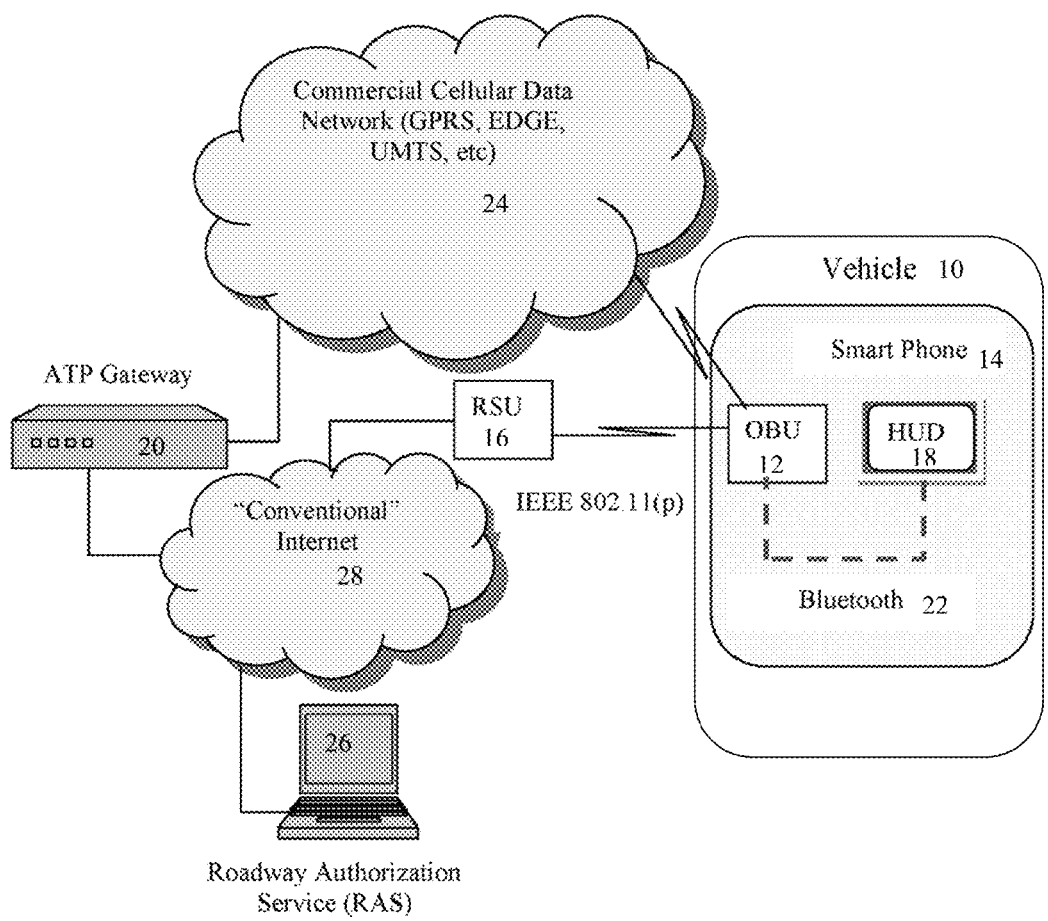
FIG. 1 is a schematic block diagram of the system overview.

FIG. 1 provides an overview of the concepts described in the present invention, in terms of the system components and their relationships to one another. On-board the vehicle 10 is an OBU 12, which may be integrated in a new vehicle or retrofitted as an aftermarket device or app, such as in a smart phone (SP) 14, a PDA, a tablet, a dash-mounted unit, a GPS receiver, etc. The OBU includes known circuitry such as one or more processors, ROM, RAM, interfaces, transmitter, receiver, antenna(s), together with computer program code useful in carrying out functions to be described below. The OBU 12 interacts with an RSU 16 according to the specifications for the complete WAVE protocol stack via, for example, transmitters and receivers in each of the OBU and the RSU. The RSU also includes known circuitry such as one or more processors, ROM, RAM, interfaces, transmitter, receiver, antenna(s), together with computer program code useful in carrying out functions tom be described below. The in-vehicle user interface (e.g., a GUI) is preferably enabled through a third-party device that provides the platform for a "heads-up display" (HUD) 18. This device may be a smart phone or a tablet computer, either of which is linked to the OBU via a Bluetooth connection. Of course, the GUI may comprise one or more of the displays on the smart phone 14, the PDA, the tablet, the dash-mounted unit, the GPS receiver, etc.

Since the OBU 12 is preferably inherently IPv6-addressable, any remote Internet host (e.g., a Roadside Authorization Service (RAS) server 26) may interact with it through the Internet 28. For example, an Internet host which directs traffic to and from a remote ATP client, e.g., an ATP Gateway 20, has the option of using IPv6 connectivity (provided that it is available) or directly to the commercial cellular network 24. A vehicle 10 can come within range of an RSU 16 where WAVE roadside infrastructure has been deployed, which is not expected to be ubiquitous for many years. To ensure maximum coverage for real-time ATP communications, the OBU 12 preferably incorporates an embedded radio modem for a commercial cellular data network 24. A typical current implementation of such technology is GPRS (General Packet Radio Service), used in conjunction with 2.5 GSM networks, although migration to EDGE (Enhanced Data Rate for GSM Evolution) and UMTS (Universal Mobile Telecommunications System) is expected as cellular carriers advance to new generations of technology with greater speeds for both voice and data, leaving the older 3G networks with more bandwidth for machine-to-machine applications such as automotive telemetry. The RAS and ATP gateway also include known circuitry such as one or more processors, ROM, RAM, interfaces, transmitter, receiver, antenna(s), together with computer program code useful in carrying out functions tom be described below.

The Heads-Up Display. If a vehicle 10 is equipped with an after-market WAVE-enabled device, that device, once is it authenticated by the RSU 16, constitutes an assurance that the vehicle will comply with IEEE 1609.3, providing Basic Safety Messages on the Control Channel which can be received by all other users of the same roadway. However, if there is no after-market HUD installed in the vehicle, there may be no means to present the driver of the vehicle with IEEE 1609.3 messages issued from its neighbors. This represents a major limitation to the utility of such devices since drivers would not benefit from the ability to take corrective measures in response to alerts. To ensure maximum effectiveness of the WAVE technology in an after-market configuration, the OBU 12 should be complemented by an HUD device 18, communicating with the OBU 12 through a local datalink in the vehicle, such as a bluetooth link 22.

The additional cost of a dedicated HUD device 18, with a preferable user interface (touch screen, keyboard, voice command interpretation and so on), can be obviated by the use of a so-called "smart phone" possessing adequate screen dimensions to support an HUD. In effect, the HUD device is "virtualized", comprising a software application running in the phone's processing environment. The smart phone is a mobile phone built on a mobile computing platform, with more advanced computing ability and connectivity than a typical feature phone. Smart phones combine the functions of a personal digital assistant (PDA) and a mobile phone or camera phone. Today's models also serve to combine the functions of portable media players, low-end compact digital cameras, pocket video cameras, and GPS navigation units. Modern smart phones typically also include high-resolution touchscreens, web browsers that can access and properly display standard web pages rather than just mobile-optimized sites, and high-speed data access via Wi-Fi, Bluetooth, and mobile broadband. The most common mobile operating systems (OS) used by modern smart phones include Apple's iOS™, Google's Android™, Microsoft's Windows Phone™, Nokia's Symbian™, RIM's BlackBerry™ OS, HP's webOS™, and embedded Linux distributions such as Maemo™ and MeeGo™. Such operating systems can be installed on many different phone models, and typically each device can receive multiple OS software updates over its lifetime. Each smart phone includes one or more processors, ROM, RAM, a display, a user input device, battery, transmitter, receiver, antenna, etc. One or more computer programs run on the processor(s) from ROM, using RAM, to effectuate the functions described above and below.

Since all of the attributes of the smart phone necessary to support the functionality described in the present invention, are characteristic of tablet computers (e.g. Apple's iPad™ or RIM's Playbook™), it is also possible to envision use of a tablet, with its significantly larger screen size, as an excellent platform for the HUD. With the exception of mechanisms that are unique to the interaction of the HUD device with the mobile phone communications network, the smart phone and the tablet are considered interchangeable as platforms for the HUD functionality described below.

Just as the OBU 12 may be subject to authentication challenge, so may the HUD 18 be subject to a similar challenge. It may be sufficient, from a road safety perspective, to simply rely on the OBU 12 to confirm that it is connected to an HUD 18 through some datalink mechanism 22. However, this may fail to exploit the full potential available when using a smart phone as a hardware platform for the HUD. An authentication challenge response may require either the IMEI (equipment identifier) or ICCID (SIM card identifier) or both, depending on the regulatory environment governing the operation of the intelligent roadways. But, regardless of the identifying information transported in a challenge response, authentication of the HUD may be a requirement of transportation regulatory authorities to use an intelligent roadway.

Figure 3:
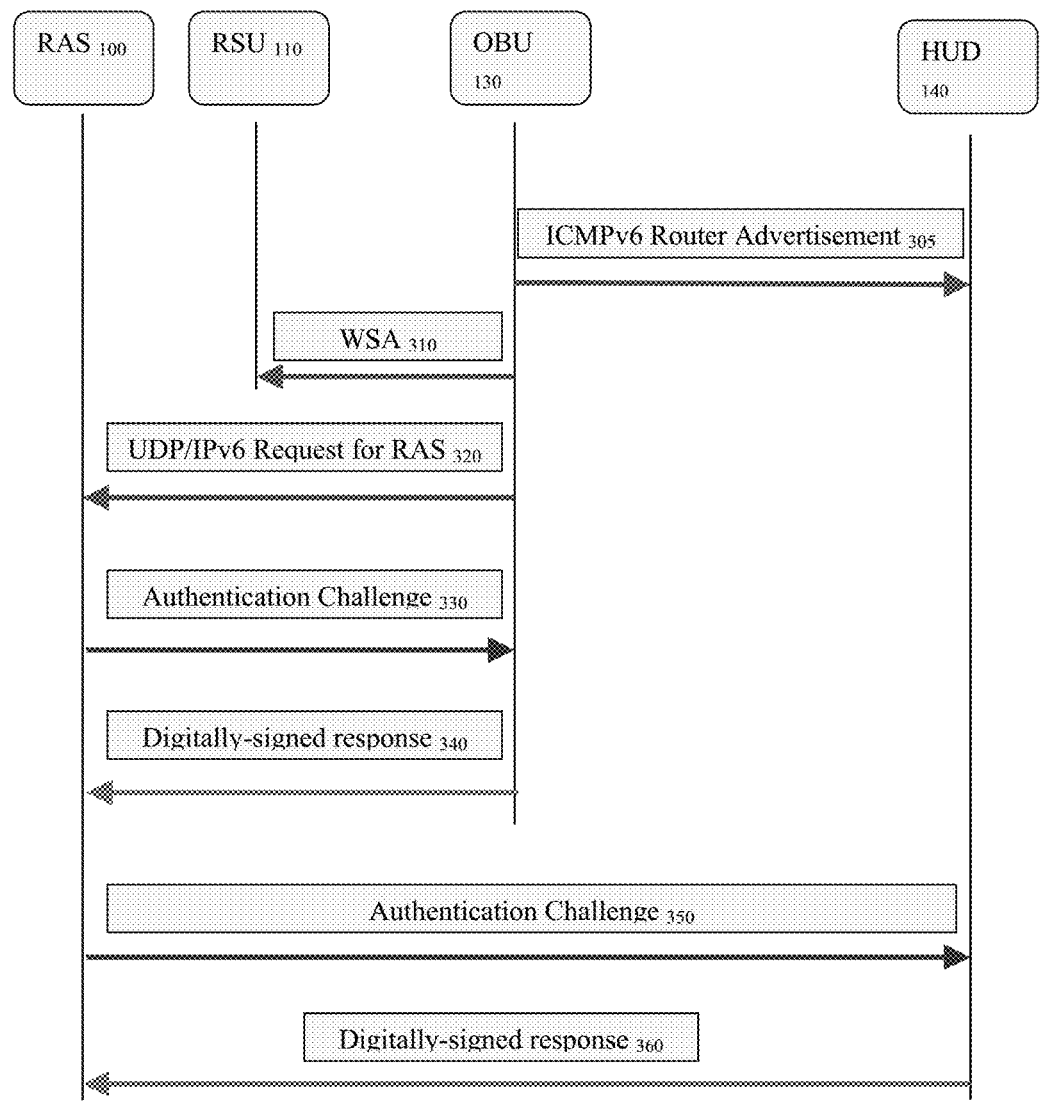
FIG. 3 is a functional diagram of the OBU and HUD authentication.

The Datalink between OBU and the HUD. In accordance with IEEE 1609.3, a WAVE-compliant OBU 130 offers IPv6 routing services, which enables the HUD 140 to establish a connection to the OBU 130 using the mechanisms provided by ICMPv6 for IPv6 router discovery. As such, the HUD 140 acquires an IPv6 address through the mechanism of Stateless address auto configuration (SLAAC), and resides on the subnet of the OBU 130. This is shown in FIG. 3. The OBU 130 broadcasts an ICMPv6 Router Advertisement 305 (whereas a smart phone will typically incorporate a WiFi interface, the RF transceiver is typically not configured for the 5.9 GHz spectrum allocated for WAVE). Hence the data link between the OBU 130 and the HUD 140 is preferably established using the Bluetooth link 22 (FIG. 1; allowing the HUD 140 to carry out a stateless address auto configuration to construct an IPv6 address.)

FIG. 3 also illustrates the mechanism whereby the OBU 130 and the HUD 140 may interact with a Roadside Authorization Service (RAS) 100. RSU 110 is associated with the entrance to a distinct intelligent roadway, and issues Wave Service Announcements (WSA) 310 on the control channel (CCH) for Neighbor Discovery on this roadway. If the WSA 310 specifies that authorization is required, it identifies an IPv6 address and port where the RAS 100 resides. OBU 130 sends a UDP/IPv6 request 320 to RAS 100, which may be followed by an authentication challenges 330 of the OBU 130, and 350 of the HUD 140. Such challenges may be answered by digitally-signed responses 340 and 360, respectively.

If authorization to use the intelligent roadway is conditional on authentication of both the OBU 130 and the HUD 140, the RAS 100 may require that the HUD IPv6 address prefix prove that the HUD and OBU are indeed on the same subnet. This creates an automatic association of the HUD to the OBU, within the database of the authorizing entity, without requiring the specification of any additional handshaking mechanism between the OBU and the HUD in order to establish the presence of the HUD. The RAS may refuse authorization to a vehicle which is not equipped with an authenticated HUD.

Disabling of other smart phone Functions during HUD Operation. When the HUD application is executing, it means that the smart phone is being used in a safety-critical fashion and may, in some jurisdictions, be subject to regulatory restrictions regarding its use while driving. The HUD application should incorporate the ability to disable out-going calls, redirect incoming calls to voice mail, and suppress all forms of visual or audible notifications that are generated by other services embedded in the device, including but not limited to, call waiting, incoming email or text message notification, mobile-terminated web push notifications. Configuration of the HUD application should allow the user to automatically execute any or all of these constraints while the HUD is active but should also be able to comply with remote commands which may be issued from the RAS as a function of the regulatory restrictions applicable to that roadway.

Figure 4:
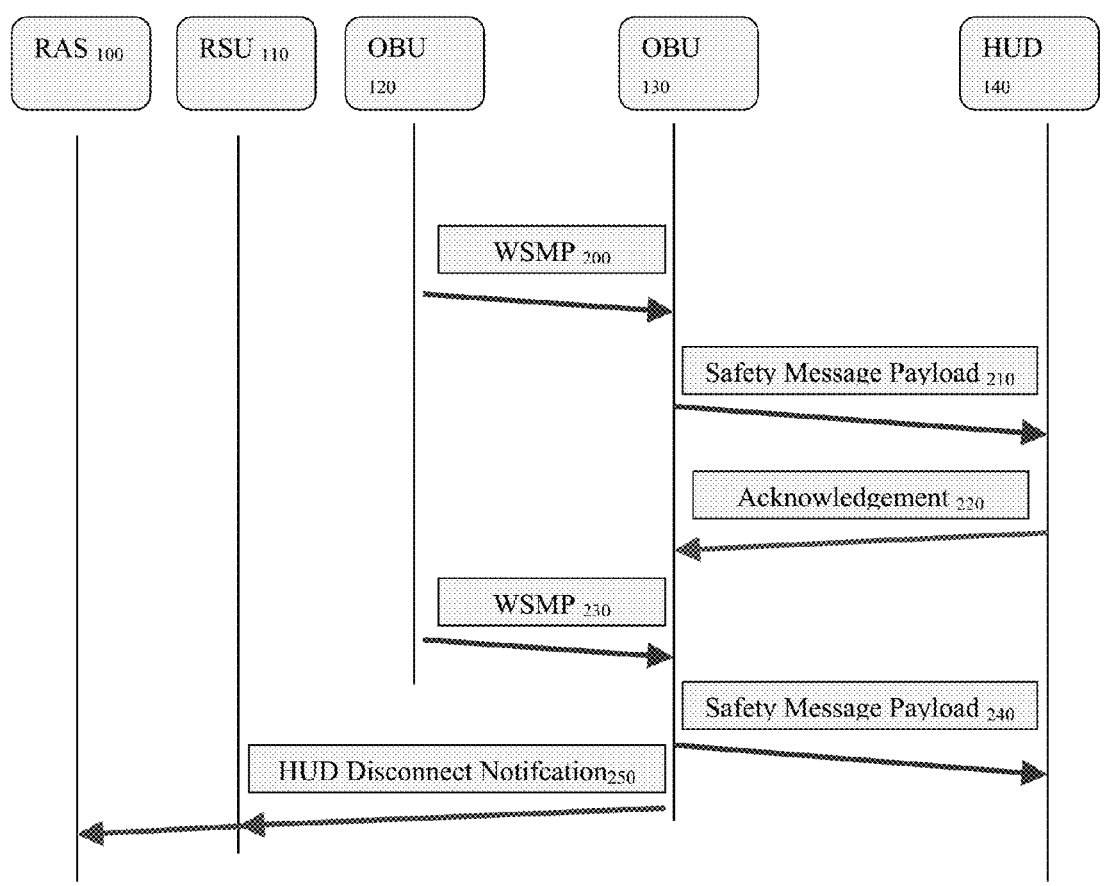
FIG. 4 is a functional diagram of the propagation of the WSMP notifications to the HUD.

HUD Disconnect Notification. The authorization of the vehicle to use the intelligent roadway may be invalidated by an indication that the HUD is no longer active. Such an indication results when the HUD fails to respond to the OBU on reception of data extracted from alerts or Neighbor Discovery (ND) announcements. This mechanism is shown in FIG. 4. The OBU 120 issues a WAVE Safety Message Protocol (WSMP) alert 200 on the control channel. This is received by the OBU 130. the OBU 130 strips out the Safety Message payload information 210 and transmits it to the HUD 140 according to a private protocol. The only rule to which this protocol should adhere in order to support this mechanism is that the receiving party should explicitly acknowledge packets. In this instance the HUD 140 sends an acknowledgement 220 back to the OBU 130.

The HUD disconnection notification would be triggered when a second WSMP alert 230 does not result in an acknowledgement. The payload 240 is sent to the HUD 140 but there is no acknowledgement due to, for example, malfunctioning or user disconnect. Regardless of the cause, the OBU 130 issues a HUD disconnection indication 250. This is a UDP/ICMPv6 message sent to the same IPv6 authorizing entity (RAS 100) that authenticated the HUD.

Real-Time Mobile-Terminated ATP Communications. If the OBU 140 is enabled for ATP communications, as described in U.S. Pat. No. 7,593,999 (incorporated herein by reference), then in order to ensure real-time connectivity for mobile-terminated ATP communications to the vehicle, the OBU 140 should incorporate a commercial wireless data technology with widespread coverage. These kinds of data services, ranging from second generation cellular GPRS/GSM to fourth generation technology such as WiMax, are expected to be deployed for many years to come with far greater ubiquity than WAVE roadside infrastructure. As such, the commercial networks will likely remain the primary medium for ATP communications with vehicles, providing service for auto insurance, remote diagnostics, roadside-assistance and other applications pertinent to the aftermarket operation of automobiles. But in order to take advantage of 802.11p connectivity to an OBU where it exists, mobile-terminated communications from ATP client entities can be routed through the RSU with which the OBU is currently sharing a data link.

Figure 5:
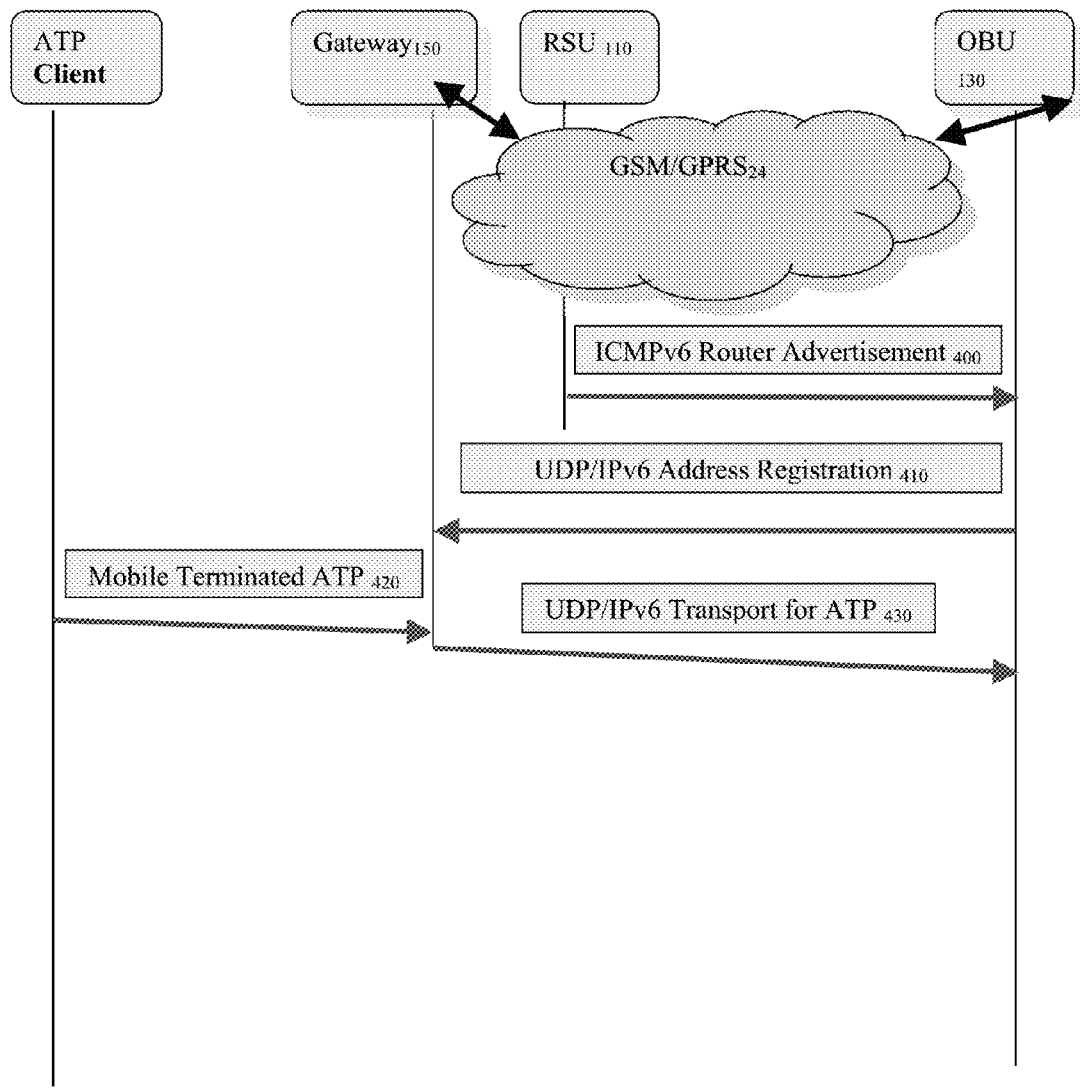
FIG. 5 is a functional diagram of the ATP communications with a WAVE-enabled OBU.

FIG. 5 illustrates the above-described mechanism. Wireless communications to a vehicle 10 (FIG. 1) through a commercial network 24, exemplified in this case by GPRS/GSM, may be attributable to one of several completely independent ATP Client entities. Preferably, all ATP communications is tunneled through a Gateway 150 that accounts for billable traffic to any mobile entity from any ATP Client, and vice versa. The ATP PDUs (the generic term Protocol Data Unit (PDU), used to refer to all ATP packets, is borrowed from SNMP) are tunneled through the Gateway 150 using a static, private IP address allocated by the Gateway when the mobile device is provisioned. Whether these addresses are IPv4, which is the case for GPRS, or IPv6, which is anticipated with more advanced commercial offerings, the Gateway 150 maintains a permanent identifier for the mobile device which is important to route mobile-terminated traffic and to account for all mobile-originated traffic based on the destination ATP Client 160.

In FIG. 5, the Gateway 150 communicates with the OBU 130 using a commercial cellular data service 24, in this case GPRS/GSM, in the absence of any alternative wireless network. When OBU 130 receives the IPv6 router advertisement 400 from RSU 110, it performs a Stateless address auto configuration. It can then send a UDP/IPv6 message 410 to the Gateway 150, so that its current IPv6 address can be registered in the Gateway database. The Gateway 150 can subsequently choose to route mobile-terminated ATP 420 traffic through the IPv6 network at 430, thereby avoiding the transmission of traffic which is billable to the account associated with the ICCID of the Subscriber Identity Module (SIM) in the mobile device (or the equivalent identifiers in the case of CDMA.). If, when the mobile-terminated PDU is transmitted, the vehicle has moved too far away from the RSU 110 to receive the signal, and has not re-registered with a new RSU, the ATP Client will not receive the response required by the protocol and may choose to retry. If the previous attempt was not followed with a response or a new IPv6 address registration, the Gateway will revert to routing the PDU through the commercial data service.

The Remote Scan Tool. An OBU 130 enabled for ATP communications consumes wireless bandwidth frugally. In ATP mode, mobile-originated PDUs are generated when exception conditions, including detection of DTCs (diagnostic trouble codes), are detected locally. The underlying transport mechanism is UDP, which is intended to minimize bandwidth consumption by reporting each detected event with a mobile-originated "packet burst" and a short mobile-terminated "acknowledgement". However, in this mode, the OBU can receive a mobile-terminated ATP command to suspend its normal operations, allowing it to open a channel of streaming communications between the vehicle data bus and a remote entity which called a "remote scan tool". This mode of operations enables an automotive diagnostician to interrogate the vehicle data bus as though using a scan tool physically connected to the OBD-II port.

Figure 6:
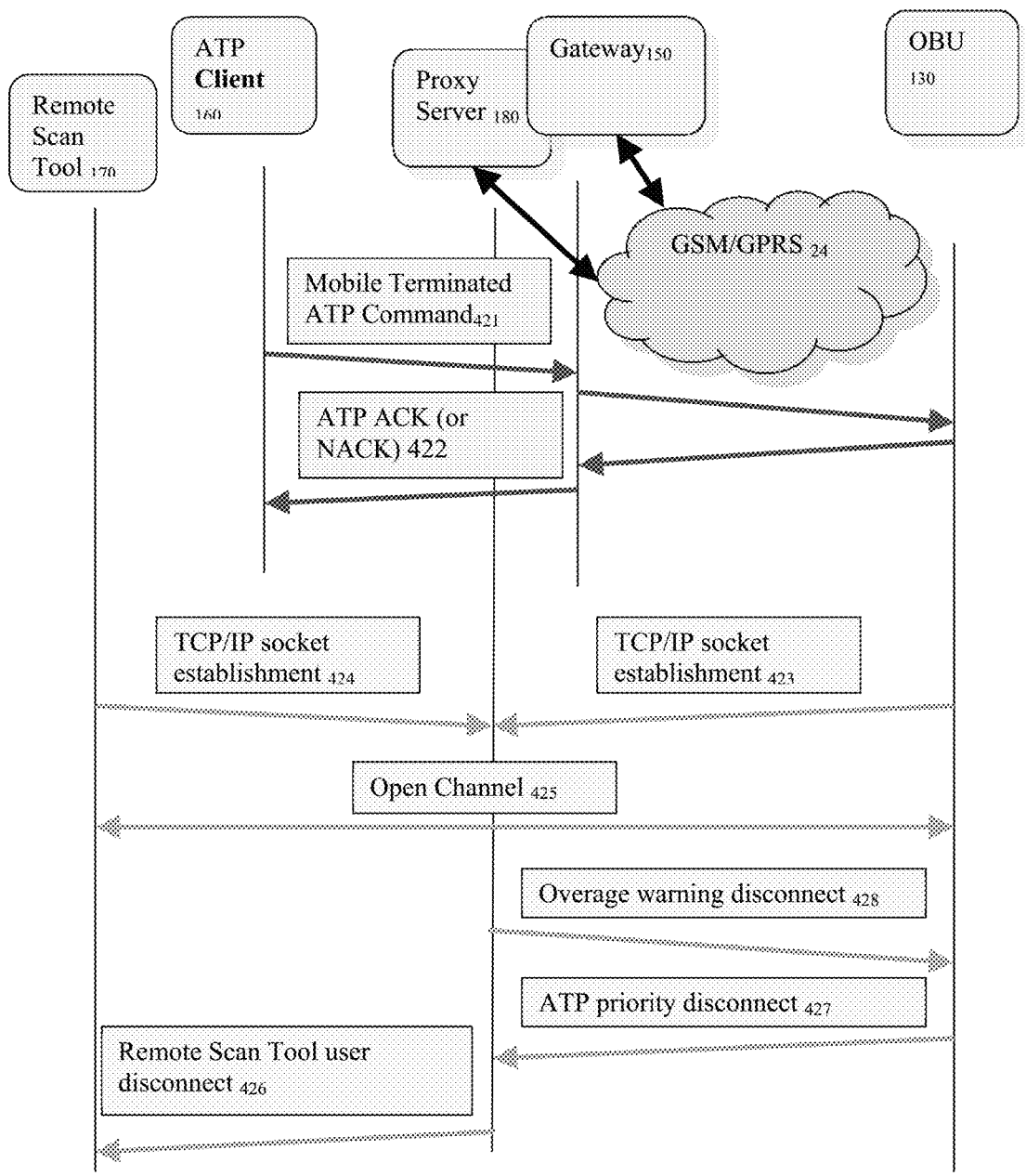
FIG. 6 is a functional diagram of the remote scan tool.

This concept is illustrated in FIG. 6. OBU 130 is an ATP-enabled device that receives a request from ATP Client 160. This request may take the form of the mobile-terminated ATP command 421, the payload of which is an IP address, or a domain name that can be resolved to an IP address, as well as a TCP port identifier. The OBU responds with an ATP ACK (or NACK) 422. The OBU uses this information to establish a connection through a TCP/IP proxy server 180 to a Remote Scan Tool 170 at 423 and 424. The mechanisms described in U.S. Pat. No. 6,263,268, and U.S. Pat. No. 7,593,999 (both incorporated herein by reference) ensure that the ATP command 421 comes from a trusted source, since the ATP Client 160 has been both authenticated as well as specifically authorized to issue the request for transition to the remote scan tool mode of operations. As previously shown in FIG. 5, the entities initiating the communications may choose to minimize billable bandwidth consumption by routing traffic through the IPv6 network, when and where it is available. However, in the more common instance where the IPv6 network is not available, traffic should be routed through a commercial cellular network 24 to the TCP/IP proxy server 180. This is necessary to prevent indiscriminate consumption of billable bandwidth, since the ATP Client that sends the original request may be one of several ATP Clients which are all sharing the responsibility for defraying the costs of the wireless service according to a pre-determined formula.

The Remote Scan Tool performs the functions of any Scan Tool that would otherwise be physically connected to the vehicle. In this mode of operations, the communications between the Remote Tool 170 and OBU 130, illustrated by the "Open Channel" 425, constitutes a "virtual" connection to the OBD-II port. Diagnostic traffic, as defined by SAE recommended practice-(SAE J1979, SAE J2190, ISO-15765, ISO-14229 and SAE J1939) or OEM proprietary protocols, may then be streamed through this connection, subject to rate-limiting mechanisms within the OBU. Since, the data bus in the latest models of vehicle is CAN, which is typically configured to operate at 512 Kbps, which exceeds the capacity of the commercial wireless networks, the rate limiting mechanisms ensure that mobile-originated data streamed onto the wireless medium does not exceed its capacity.

The Remote Scan Tool Disconnect. The OBU 130 returns to its normal (ATP) mode of operations when the TCP./IP connection is closed. This can be precipitated by one of the following events:

the Remote Scan Tool user closes the diagnostic session (Disconnect 426)

the OBU detects loss of communications with the vehicle data bus (Disconnect 427)

the TCP/IP proxy server determines that wireless bandwidth consumption is approaching a billable overage threshold (Disconnect 428)

the OBU has detected automotive events requiring real-time reporting via ATP communications, such as collision detection. (Disconnect 427).

Figure 2:
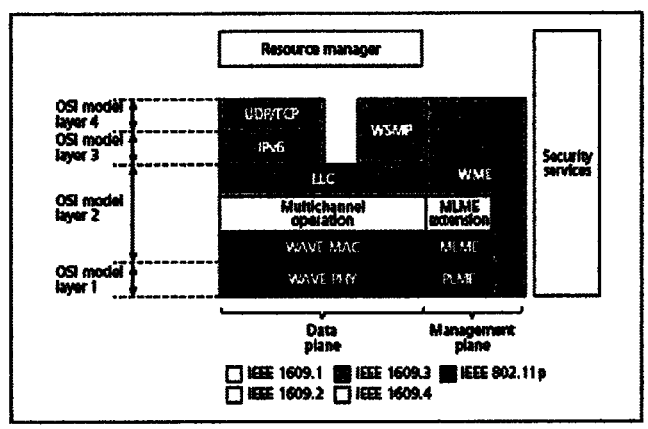
FIG. 2 is a schematic block diagram of the WAVE architecture.
Figure 7:
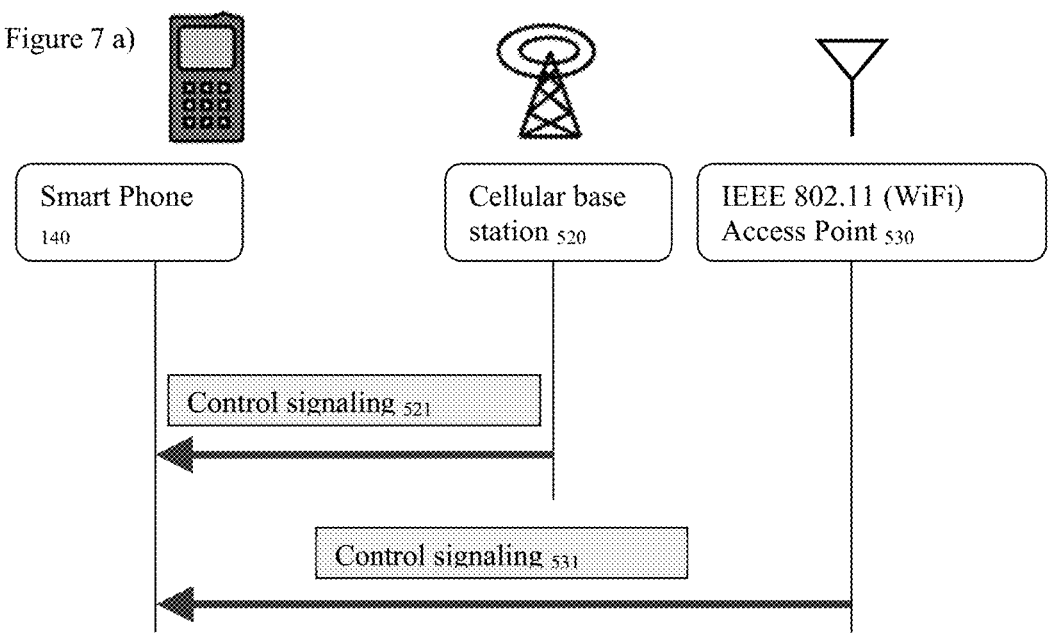
FIGS. 7a and 7b are schematic block and functional diagrams of the smart phone geo-positioning using cellular or WiFi signals.
Figure 7:
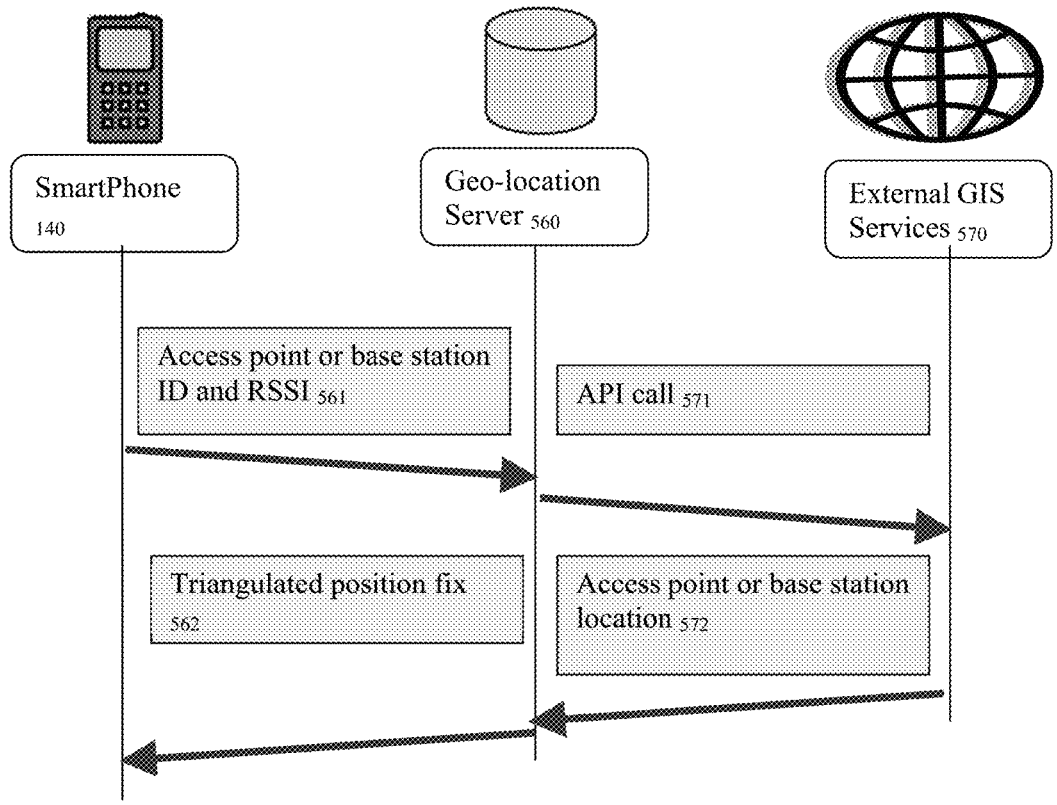

The Geo-location service. The software application in the smart phone's processing environment preferably incorporates a mechanism which utilizes IEEE 802.11 'hot spot' and/or cellular connectivity to determine geo-location with a much greater precision than the accuracy achievable from a GPS receiver embedded in the OBU (where typical precision is less than 1 foot.). This has significant advantages when an OBU issues Neighbor Discovery reports or WSMP alerts, since the margin of error in conventional GPS may be greater than the distance travelled within a single time interval between reports. The high-level process, as shown in FIGS. 6, 7(*a*), 7(*b*), and 8, preferably comprises 6 elements:

1. Smart Phone
2. Reference Points (Cellular base stations or WiFi hot spots)
3. Geo-location Server
4. External GIS (Mapping) Service
5. OBU
6. RSU At the core of this process is the Geo-location Server 560, which assumes the primary computational load of continuously recalculating the position fix for the smart phone based on the inputs provided. This is illustrated in FIG. 7. As shown in FIG. 7(*a*), the Smart Phone 110 (preferably, the same system component as HUD 140 of FIGS. 2 and 3) may receive control signaling 521, 531 from either cellular base stations 520 or WiFi Access Points ("hot spots") 530, or both. The term "control signaling" is used here in a generic sense to refer to any packets received at the medium access control (MAC) layer with enable the receiver to identify the transmitter and to determine an RSSI. FIG. 7(*b*) shows that the information arising from reception of this signaling is delivered via a wireless data packet 561 to the Geo-location Server 560. The Geo-location Server 560 makes an API call 571 to an external Geographic Information Systems (GIS) service 570 in order to obtain, via the data packet 572, the fixed geo-coordinates 562 for the base station(s) and/or access points reported by the Smart Phone 140. There are several GIS commercial on-line services available. The current implementation of the Geo-location Service uses the one from ESRI. This information, combined with the RSSI for each base station or access point, provides the requisite inputs for trilateration (or triangulation where conditions dictate) of the smart phone's position, which is then be sent back to the smart phone via data packet 562. Each WiFi Access Point and cellular base station includes known circuitry such as one or more processors, ROM, RAM, interfaces, transmitter, receiver, antenna(s), together with computer program code useful in carrying out functions to be described above and below.

The algorithm used to maintain a real-time geo-location, based on the best availability of fixed geographic reference point, is illustrated in FIG. 9. This algorithm is executed within the Geo-location Server 560, receiving inputs from the mobile device 510 and reporting position fixes back to the mobile device.

In FIG. 9, the smart phone 510 initializes geo-location 550 through an API call 571 to the external GIS (Geographic Information Systems) service 570. This call provides information collected from the smart phone which encompasses unique identifiers for any IEEE 802.11 access points ("hot spots") or cellular base stations, as well as their associated RSSI (received signal strength indicators).

The decision block 551 chooses which reference (most reliable) infrastructure to use for trilateration of the local position of the smart phone. Preference is given to IEEE 802.11 (WiFi) infrastructure if it visible. If not, the cellular network is used. In either case an API call (552 for cellular and 553 for IEEE 802.11) is issued to initialize a known trilateration method available to the Geo-location Server.

Process 554 trilaterates the local position of the smart phone using cellular network information. It determines the relative proximity of the three base stations with the strongest signals and trilaterates using the known locations of these base stations. Alternatively, process 555 trilaterates the local position of the smart phone using the MAC address(es) of hot spot(s). The IEEE 802.11 trilateration method may rely on less than 3 signal sources to establish a position fix. It determines the relative proximity of the hot spot(s) with the strongest signal(s) and trilaterates using their known locations.

The position fix resulting from either trilateration process is handed off to decision block 556, which checks its validity by determining whether it is consistent with the previous fix.

If valid, process 558 updates the database with the latest information and derived location for the mobile device, sends the position fix to the device, and proceeds to the next iteration. For example, garbage collection and memory flush; update device data; and clear required variables for memory efficiency. If not valid, process 557 flags the software object, corresponding to the device, accordingly, and proceeds to the next iteration aware that if a pre-defined number of successive failures of this nature occurs, an alert can be sent to the mobile device requesting a reset.

FIG. 9 depicts the process for each update of the geo-position fix. Since this can be typically executed as frequently as every 100 ms, the result may be an inefficient use of cellular bandwidth, which preferably should be avoided. Therefore, in an alternative configuration of the process, the logic of the geo-location server 560 in FIG. 9 is embedded in the Smart Phone. In turn, as illustrated in FIG. 10, the Smart Phone queries the external GIS system to retrieve the geo-location of each new cellular base station or WiFi Access Point that becomes visible in terms of its RSSI, and therefore a candidate for a trilateration reference point. The geo-location information is propagated back to the Smart Phone in the data packets 573 and 563. FIG. 11 illustrates the alternative process to that of FIG. 9, encompassing an embedded version of the geo-location logic, wherein the decision block 540 is added to allow for retrieval of geo-position information for new trilateration reference points.

WAVE vs. WiFi. Whereas WiFi connectivity is a standard feature of smart phones, the RF transceiver may not be tuned for the 5.9 GHz frequency band allocated for WAVE and it would appear unlikely that regulatory approval for use of the WAVE band, by anything other than systems directly related to roadway safety (e.g., new vehicles or aftermarket retrofit devices connecting via the OBD port) would be forthcoming. Hence the smart phone would likely not share the same medium with an RSU (which is effectively the WAVE equivalent of a WiFi Access Point) and direct acquisition of the inputs needed to trilaterate (or triangulate) a position fix, as illustrated by the Control Signaling 531 in FIG. 7(*a*), would not be possible.

However, the WAVE medium is shared by the WAVE OBU, which can relay the information via the Bluetooth datalink to the smart phone. This is illustrated by the RSU ID and RSSI message 121 in FIG. 8. The RSU ID and RSSI information can be forwarded to the smart phone so that it can be used as inputs to the remote Geo-location server. This information packet going from the OBU to the smart phone is labeled 121 in the drawing. The position fix returning from the Geo-location Server 560 is delivered back to the smart phone in exactly the same manner as in the previous case illustrated in FIG. 7(*b*), with data packets 572 and 562.

In an alternative configuration of this process, the OBU constitutes the embedded WAVE capability of a new automotive OEM vehicle, which includes its own dedicated display and may not have an embedded 4G cellular capability (a feature being contemplated by some manufacturers for certain vehicle models). In this configuration, the mechanism whereby the RSU ID and RSSI are forwarded by the OBU to a Smart Phone, as shown in FIG. 8, is not applied. FIG. 12 illustrates this alternative configuration, wherein an Internet-based connection to the external GIS server is established directly by the OBU, using the WAVE RSU as its access point to the Internet, and the entire process described in FIG. 9, as it relates to the use of the 802.11 infrastructure only (since the cellular infrastructure is, by definition, unavailable) is executed within the OBU.

In yet a further refinement of this process, the WAVE Service Advertisement 111 shown in FIG. 8 would specify a WAVE application, duly registered in accordance with the provisions of IEEE 1609.1, and the IP address at which it resides, preferably the RSU itself. This service effectively replaces for the external GIS server 570 shown in FIG. 9, and would provide, on demand from authenticated OBUs, the geographic coordinates of the RSU. This refinement is illustrated in FIG. 13, wherein the WAVE Service Advertisement 111, in accordance with the provisions of WSMP, announces the availability of the WAVE application 115 to the OBU 120, which in turn uses the RSU ID, encapsulated in the service announcement, to request the location of the RSU from the specified WAVE application. This is a simple request/response exchange that lends itself to the use of UDP connectionless transport, avoiding the unnecessary overhead of TCP. The request is therefore sent as a UDP/IPv6 packet to the WAVE application 115, which responds with the RSU location in the UDP/IPv6 packet 564. The WAVE application 115 may be a central database containing the geo-location information for all RSUs, in a manner similar to the GIS service 570, but preferably resides at an assigned virtual port within the RSU IP address space. Also preferably, the RSU's geo-location is acquired a priori, as part of the RSU's physical installation and provisioning, from an external service such as the GIS service 570, These provisions ensure the lowest possible latency in responding to an OBU's request for RSU geo-location In yet another configuration of this process, the Smart Phone is enabled for WAVE, including an RF transceiver tuned for the allocated WAVE RF spectrum and the associated WAVE protocol stack. In this scenario, the Smart Phone does not require the RSU ID and RSSI information relayed via the Bluetooth link from the OBU, and may execute the process shown in FIG. 9, and optionally the refinements of this process as described above. This is illustrated in FIGS. 14(*a*), 14(*b*), an 14(*c*), wherein the WAVE-enabled Smart Phone 145, having extracted the RSU ID from the service announcement 111, requests the location for the RSU 110 from the External GIS Service 570, or alternatively from the dedicated WAVE application 115 residing within the RSU itself as shown in FIG. 13.

While the smart phone is operating in HUD mode, the geo-location fixes generated by this process may be used by the OBU to supersede the less accurate fixes available from its own GPS receiver. The accuracy of geo-location fixes is important to the ability of WAVE to deliver the quality of information in the Basic Safety Message (BSM) suite needed to achieve the safety objectives of SAE J2735. The level of geo-location precision which is commonly seen as required by the automotive OEMs as well as the federal agencies associated with WAVE, is <1 meter. Not only is this level not achievable with currently available GPS technology, even with anticipated improvements in GPS technology, geo-location is not reliable on a ubiquitous basis, given that satellites signals may not reach the vehicle in all circumstances, such as urban canyons or subterranean roadways. Since roadside infrastructure should, ipso facto, be present in areas where regulators choose to require the use of WAVE, geo-positioning using RSUs as reference points provides the required reliability. However, the level of precision can be degraded by several factors:

1. Accurate positioning preferably uses a minimum of three reference points (i.e. trilateration and/or triangulation), which, depending on the pattern of deployment of roadside infrastructure, and the proximity to other WAVE-enabled roadways, may not always be available.

2. Since it cannot be assumed that high-precision surveying equipment will always be used to acquire a position fix during installation and provisioning, geo-location information for RSUs, described above, may encompass small errors.

As part of the lateration process, the determination of distance from a reference point is a function of received signal strength. Transient factors affecting signal propagation, such as foliage and atmospheric conditions, may therefore cause the results of any range calculation to defy repeatability. Field tests conducted by the authors, using WiFi access points as references, have shown that geo-position calculations repeated at 100 ms intervals when the mobile device is stationary, will often result in a scattering of positions around the true location. In order to consistently maintain accuracy within the 1 meter requirement for WAVE, a mobile device should continuously factor these dynamic conditions into its geo-positioning methodology.

The methodology proposed here to counter these factors is based on a two-pronged approach:

1. In instances where only two RSUs are available, the distance from either one of them can be determined by comparing the relative measures of signal strength received at both the mobile and the opposite RSU. This method of geo-location using only two reference points is illustrated in FIG. 14(b). Since the distance between RSUs A and B can be computed from the reported locations, then the relationship between the distance from A and its received signal strength can be extrapolated from the relationship between the distance from A to B and the signal strength received at B. The signal strength of A, received by B can be reported in the WAVE Service Advertisement 111, described above and depicted in FIG. 13. The formula $$D_A = (D_{A-B} \times RCPI_{A-B}/RCPI_A) \times \beta \quad (1)$$

yields a value $D_A$, for distance from the mobile device to the RSU A, where the relationship $\beta$ may be established heuristically from fields tests comparing estimated values to actual known values.

2. The margin of error in the geo-location of the reference points may result in an unacceptable level of error in the computed geo-position. A heuristic technique consisting of the following steps may be applied as an error-correcting procedure:

a. While the mobile is stationary (which can be determined using the internal gyroscope of a Smartphone), compute a sequence of geo-positions at regular intervals over a short time period, which should be less than 1 ms.

b. Compute the total distance of the graph joining all the measured locations acquired in step b to the starting location. This is illustrated in FIG. 14 (c) where the total distance is equal to the sum of $d_1$, $d_2$, $d_3$, etc.

c. On the first iteration do nothing, d. On subsequent iterations, if this distance is greater than the previous one, adjust the geo-location of the first reference point by varying the polar coordinates r (radius) and θ (angle) at regular intervals. These are expected to be, respectively, 30 degrees and 5 meters but may be adjusted depending on empirical results.

e. If the total distance of the graph increases relative to the previous point, continue iterating by looping back to step a. If not, switch to the other reference point before looping back to step a.

f. Continue looping through steps a-e until the total graph distance falls below a pre-determined threshold which should not exceed 10 meters.

The Mobile Trending Data Collection. Smart phones in vehicles enable the implementation of a cooperative system which allows not only for tracking of geographic trends exhibited by each smart phone but also for enhancing the awareness that each smart phone has of 802.11 (WiFi)-enabled devices in its geographic surroundings. In this system, each smart phone is responsible for keeping track of its own geo-locations as well as its proximity to other WiFi-enabled devices. This information is stored locally using the SQL database services of the smart phone operating environment and captured in periodic snapshots which are uploaded to a remote geo-location server. Concomitantly, the remote geo-location server may, using its knowledge of the geo-locations of other WiFi-enabled devices, send information to the smart phone which constitutes an enhancement of that smart phone's awareness of its surroundings.

The logic flow of the distributed data capture and upload process is illustrated in FIG. 15. The data collection process 610 stores location and device status information, all the elements of which are subject to authorization by the smart phone subscriber, in the local database until the user-configurable configurable timer 620 triggers an event 630, typically within a range of 1-560 seconds, more preferably, 10-120 seconds, most preferably 60 seconds. The data loader 640 sleeps until the event 630 is triggered and then retrieves the 'snapshot' 650 from the database, comprised of Geo-location and device status information since the last snapshot, which is then queued for upload. The distribution timer and temporary data queue process 660 transmits the queued snapshots to the Geo-location Server, at configurable intervals subject to the availability of a wireless network connection, using the Data Export process 670. The Data Receiver process 710 submits the received data to a validation test 720 which comprises an authentication of the mobile device (if the wireless connection is being established) and data integrity checks on information payloads. The results of this test are passed to the pass-fail decision block 730, which returns these results to the Data Receiver 710. Whether pass or fail, the decision block 730 returns the results of the validation test to 710. If the results are pass, it also posts the data for storage. If the validation test 720 has passed, posts the data for storage in the Master database 740. The Analytical Tool 750 is a post-processing task that determines whether there are patterns that have accumulated in the database 740 which have potential commercial value resulting from an understanding of both the individual and aggregate geo-spatial behavior of the devices tracked in the database. The results of this may be made available through a Web service interface to one or more third-party Web clients 580, including social networking sites, which would not otherwise be able to have access to this kind of information.

The results of the validation test are sent back to the mobile device as either a positive or negative acknowledgment so that the decision block 690 (FIG. 15) can determine whether to discard the data or to inform the Data Loader 640 so that the snapshot may be committed to the local database.

The Geo-location Server is uniquely capable of knowing the geo-locations of all WiFi-enabled devices, particularly of mobile devices, i.e., other smart phones (or tablet computers). In the case of a public Access Point installed in a commercial establishment or public facility such as an airport or university, the geo-location is static and therefore the smart phone in motion does not require updates for these devices in order to enhance its geographic awareness. However, the geo-locations of mobile WiFi-enable devices, detected by the smart phone at the IEEE 802.11 MAC interface, cannot be known unless these same devices are also sending periodic data snapshots to the Geo-location Server, which enables the latter to maintain the geographic awareness of each participating smart phone.

The interaction between the plurality of mobile WiFi-enabled devices, mediated by the Geo-location Server, is shown in FIG. 16. Both smart phones 140 and 192 post (periodic) snapshots 141 and 191 of information comprising device status information and geo-locations tracing the route since the previous snapshot, as well as the MAC addresses of WiFi-enabled devices within range. Furthermore, the smart phone may include an indication that it is currently operating with a Bluetooth connection to a WAVE OBU. Since the OBU is identifiable with its MAC address, the mobile phone can therefore identify the vehicle in which it moving, so that the Geo-location Server can populate a central database identifying not only smart phone devices but also vehicles.

The Geo-location Server may therefore send geographic awareness updates 142, 192 back to the smart phones. Commercial or social networking information may be linked to the WiFi-enabled devices within current proximity to the receiving smart phone, and included in these mobile-terminated awareness updates. Determination of when these updates should be sent, and what information should be included in them, can be based both on relevance and value to the mobile devices, as enabled through the mobile device in a user-selectable manner, as well as on the policies of third-party Web clients 580, shown in FIG. 15, that have been authorized by the mobile devices to initiate mobile-terminated "push" messages to them.

In yet a further refinement of the foregoing processes, an algorithm is implemented in the smart phone to enable measurement of acceleration along both the lateral and longitudinal axes of the vehicle. This algorithm is dependent on sampling of heading indicated by the earth compass, which is now a standard feature of smart phones, at each cycle of the geo-location process. This process becomes a "virtual accelerometer" in that it substitutes for the embedded accelerometer in the smart phone, which can only detect acceleration along the 3-axes of the smart phone itself, a capability which cannot be exploited to reliably monitor driving behavior, or detect vehicle collisions.

The contrast between acceleration as measured by the "virtual accelerometer" and by the embedded accelerometer in the smart phone, is illustrated in FIG. 17(a). During the interval that the virtual accelerometer may detect forward movement of the vehicle 590, the embedded accelerometer may also detect lateral movement due to the smart phone being rotated on its vertical axis, which is not reflect of the vehicle movement. Hence, since the smart phone is subject to such movements within the vehicle, its internal accelerometer is not a reliable source of acceleration measurements for the vehicle itself.

FIG. 17(b) is a logic flow diagram for the virtual accelerometer process, which starts with decision block 556 from FIG. 11. This can take effect at each geo-location cycle, which is typically at 100 ms or 50 ms intervals. If the position fix is valid, decision block 581 establishes whether the distance from the previous position exceeds a pre-determined tolerance, in which case the new position is considered to reflect movement and decision block 582 determines whether a change in heading has been detected. If there is no change in heading, function block 583 computes a longitudinal acceleration (or deceleration) value. If a change in heading has occurred, the acceleration measurement includes a curve measurement. On subsequent cycles, acceleration measurements will be plotted along a curve provided that the heading continues to change Once the heading remains constant, the curve measurement is dropped from the acceleration formula.

The use of the virtual accelerometer is coincident with the configuration described above, wherein the acceleration measurements are reported to remote usage-based insurance (UBI) ATP client systems, either through an external OBU with its own wireless communication channels or through the wireless connectivity directly accessible to a WAVE-enabled smart phone acting as its own OBU.

In a further refinement of this process, the IMSI (International Mobile Subscriber Identity) of the smart phone serves as a proxy for a driver identification, which can be reported to an ATP client system either through an external OBU, or through the wireless connectivity directly accessible to a WAVE-enabled smart phone acting as its own OBU.

Advantageous Features according to the present invention include:

A device comprising WAVE-enabled aftermarket device (OBU), connected to OBD port and incorporating ATP.

A method enabling a smart phone to emulate an HUD connected to the OBU noted above, through IPv6 Stateless auto configuration over Bluetooth data link.

A method enabling the HUD (as defined above) to disable out-going calls, redirect incoming calls to voice mail, and suppress all forms of visual or audible notifications that are generated by other services embedded in the smart phone, including but not limited to, call waiting, incoming email or text message notification, and mobile-terminated web push notifications.

A method enabling the HUD (as defined above) to interact with a remote geo-location server in order to obtain triangulated (or trilaterated) position fixes that can supersede, with greater accuracy, the position GPS fixes obtained from the OBU's own embedded GPS receiver.

A method enabling the remote geo-location server to accumulate and analyze location information, obtained from said smart phones, rendering geographic awareness updates available to the smart phones, as well as to third parties authorized to push information to the smart phones.

A network comprising Roadway Access Servers operable to communicate with HUDs (as defined above) via IETF-specified transport protocol (e.g. UDP or TCP)/IPv6, whereby both OBU (as defined above) and HUD (as defined above) may be authenticated according to provisions of IEEE 1609.2, and to verify that the HUD is connected to the IPv6 subnet of the OBU.

A method enabling OBU (as defined above) to issue a HUD disconnect notification to the RAS (as defined above).

A network comprising a plurality of ATP Clients, a plurality of OBU devices (as defined above) and a dedicated Internet-address host machine, referred to as a Gateway, operable to:

route ATP PDU's between OBU devices and ATP Clients;

to maintain a database of permanent identifiers for each OBU; and to receive IPv6 address notifications from an OBU when it attaches itself to an RSU subnet.

to redirect mobile-terminated ATP PDUs to the said OBUs through the IPv6 network created by the deployment of WAVE roadside infrastructure and to redirect mobile-originated ATP PDUs received through said IPv6 network to ATP Clients.

A method of enabling the OBU (as defined above) to issue an IPv6 address registration to the Gateway (as defined above).

A method of enabling the OBU to open a virtual direct connection to the OBD-II port, allowing streaming of diagnostic traffic between a remote scan tool and the vehicle.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. patents and patent applications discussed above, as well as all articles, documents, papers, specifications, etc., referenced above are hereby incorporated by reference into the Detailed Description of the Preferred Embodiments.

What is claimed is:

1. A roadside unit (RSU) comprising:
    at least one processor running at least one computer program adapted to enable the RSU to:
        (i) comply with IEEE 802.11p Wireless Access Vehicular Environment (WAVE) functionality, including the IEEE 1609 suite of specifications;
        (ii) cause the RSU to broadcast, in accordance with IEEE 1609.1 using a WAVE Services Announcement, a User Datagram Protocol (UDP) port and Internet Protocol version 6 (IPv6) address of a UDP/IPv6-based geo-location service from which a vehicle On Board Unit (OBU) may acquire the geo-location of said RSU,
        (iii) cache at least one Received Signal Strength Indicator (RSSI) value associated with Radio Frequency (RF) reception by said RSU of at least one IEEE 802.11p frame transmitted from at least one neighboring RSU, and
        (iv) include said at least one RSSI value corresponding to the transmission of said at least one neighboring RSU in said IEEE 1609.1 WAVE Service Announcement, which information is configured to cause a receiving vehicle OBU to calibrate the distance, estimated according to the RSSI associated with transmission received by said OBU, from said at last one neighboring RSU, and improves the accuracy of the geo-location of the RSU's own position determined by said OBU.

2. The roadside unit (RSU) according to claim 1, wherein the at least one processor running the at least one computer program is configured to comply with the Automotive Telemetry Protocol.

3. The roadside unit (RSU), according to claim 1, wherein the at least one processor running the at least one computer program is configured to enable the RSU to (i) provide the said UDP/IPv6-based geo-location service, (ii) acquire said RSU's own geo-location from any remote Geographic Information System host, and (iii) respond to UDP requests from the OBU with the geo-location of the RSU.

4. A roadside unit (RSU) comprising:
    at least one processor running at least one computer program adapted to enable the RSU to:
        (i) comply with IEEE 802.11p Wireless Access Vehicular Environment (WAVE) functionality, including the IEEE 1609 suite of specifications; and
        (ii) to cause the RSU to broadcast, in accordance with IEEE 1609.1 using a WAVE Services Announcement (WSA), a User Datagram Protocol (UDP) port and Internet Protocol version 6 (IPv6) address of a remote Roadway Authorization Server (RAS) whereby a vehicle On-Board Unit (OBU) receiving said WSA is caused to issue a UDP/IPv6 authorization request to said RAS.

5. The roadside unit (RSU) according to claim 4, wherein the at least one processor running the at least one computer program is configured to comply with the Automotive Telemetry Protocol.

6. A Roadway Authorization Server (RAS), comprising:
    at least one processor running at least one computer program adapted to communicate with at least one of (i) a vehicle On Board Unit (OBU) requesting authorization and (ii) a device having configured itself on a subnet of the OBU according to Stateless Address Auto Configuration (SLAAC), and wherein said RAS is enabled to:
    in response to a request for authorization from said at least one of (i) said OBU and (ii) said device, to challenge said at least one of (i) said OBU and (ii) said device for identifying information, encrypted according to the security provisions of IEEE 1609.2, to identify the device;
    to authenticate said at least one of (i) said OBU and (ii) said device, or
    to not authenticate said at least one of (i) said OBU and (ii) said device, and consequently refuse access to the WAVE network, in accordance with provisions of IEEE 1609.2.

7. A Roadway Authorization Server (RAS) as defined in claim 6, wherein the identifying information includes an IMEI (International Mobile Equipment Identifier) or an ICCID (SIM card identifier) or both.

8. A Roadway Authorization Server (RAS), comprising:
    at least one processor running at least one computer program adapted to communicate through a Road Side Unit (RSU) with at least one of (i) a vehicle On Board Unit (OBU) requesting authorization and (ii) with a device having configured itself on the subnet of OBU according to Stateless Address Auto Configuration (SLAAC) said RSU issuing an instruction to the said at least one of (i) said OBU and (ii) said device, in the form of a WAVE Services Announcement (WSA) which identifies an IP address and port of said RAS, and wherein said RAS is enabled to:
    in response to a request for authorization from said at least one of (i) said OBU and (ii) said device, to challenge said at least one of (i) said OBU and (ii) said device for identifying information, encrypted according to the security provisions of IEEE 1609.2, to identify said at least one of (i) said OBU and (ii) said device;

to authenticate said at least one of (i) said OBU and (ii) said device, or to not authenticate said at least one of (i) said OBU and (ii) said device, and consequently refuse access to the WAVE network, in accordance with provisions of IEEE 1609.2.

* * * * *